(12) United States Patent
Ning et al.

(10) Patent No.: US 12,549,008 B2
(45) Date of Patent: Feb. 10, 2026

(54) HARMONIC REDUCE SYSTEM AND UNINTERRUPTIBLE POWER SUPPLY INCLUDING SAME

(71) Applicant: SANTAK ELECTRONIC (SHENZHEN) CO., LTD., Guangdong (CN)

(72) Inventors: Huahong Ning, Guangdong (CN); Dan Liu, Guangdong (CN); Yulong Hao, Guangdong (CN); Lei Cao, Guangdong (CN); Dawei Zheng, Guangdong (CN)

(73) Assignee: Santak Electronic (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 18/941,585

(22) Filed: Nov. 8, 2024

(65) Prior Publication Data

US 2025/0158402 A1    May 15, 2025

(51) Int. Cl.
*H02J 3/01* (2006.01)
*H02J 9/06* (2006.01)

(52) U.S. Cl.
CPC ............... *H02J 3/01* (2013.01); *H02J 9/063* (2020.01)

(58) Field of Classification Search
CPC .................................. H02J 3/01; H02J 9/063
See application file for complete search history.

(56) References Cited

U.S. PATENT DOCUMENTS

| | | | | |
|---|---|---|---|---|
| 11,007,891 | B1* | 5/2021 | Kamal | H02J 13/00002 |
| 11,270,243 | B1* | 3/2022 | Roy | B60L 53/67 |
| 11,962,150 | B1* | 4/2024 | Bi | H02J 3/381 |
| 2022/0029581 | A1* | 1/2022 | Zhu | H02S 40/38 |
| 2022/0082087 | A1* | 3/2022 | Howard | H02J 3/46 |
| 2023/0024900 | A1* | 1/2023 | Ayoola | B60L 55/00 |
| 2025/0070563 | A1* | 2/2025 | Alotaibi | H02J 3/18 |

* cited by examiner

*Primary Examiner* — Rexford N Barnie
*Assistant Examiner* — Esayas G Yeshaw
(74) *Attorney, Agent, or Firm* — Stanek Lemon Crouse & Meeks, PA

(57) ABSTRACT

The present invention provides a harmonic reduce control system for controlling an inverter, including a phase-locked loop controller, a voltage sum loop controller, a repetitive controller, a current loop controller, and a harmonic obtaining module. The harmonic obtaining module detects a harmonic value of a load current. The control system generates an inverter current reference value based on a first current value output by the voltage sum loop controller and the harmonic value, calculates a real-time frequency value based on a voltage of the power grid, obtains, through calculation, a repetitive controller output value based on the inverter current reference value, the inverter output current, and the real-time frequency value, and outputs a first duty cycle based on the repetitive controller output value. The control system limits the inverter output current based on the first duty cycle.

13 Claims, 18 Drawing Sheets

HARMONIC REDUCE SYSTEM AND UNINTERRUPTIBLE POWER SUPPLY INCLUDING SAME

TECHNICAL FIELD

The present invention belongs to the field of power quality management, and in particular, to a harmonic reduce system and an uninterruptible power supply including the same.

BACKGROUND

A power conversion apparatus or an uninterruptible power supply (UPS) including the power conversion apparatus is a power supply apparatus widely used in the industrial field, and mainly includes a rectifier, an inverter, an alternating current solid-state switch, and the like. For the uninterruptible power supply, when a mains voltage is normal, the uninterruptible power supply is in a mains mode, and the mains supply supplies power to a load. When the mains voltage is abnormal or during a power outage, the uninterruptible power supply is in a battery mode, and an inverter is controlled to work to convert a direct current provided by a rechargeable battery pack into an alternating current to supply power to the load.

In an existing uninterruptible power supply or power conversion apparatus, the quality of an output waveform of an inverter may deteriorate or even system instability is caused, for example, a voltage and current waveform on a power grid side is distorted, due to a possible non-linear factor on a load side.

FIG. 1 shows a brief schematic block diagram of an uninterruptible power supply. The uninterruptible power supply 10 includes a rectifier 101, an inverter 103, and a bypass module 102. In a conventional mode of the uninterruptible power supply 10, an alternating current voltage input from a mains supply 100 preferably passes through the rectifier 101 and the inverter 103 and is output to a load 105, and the bypass module 102 (shown as an SCR solid-state switch) in FIG. 1 is turned off and is not operating. However, in another "high-efficiency mode" with higher economic and efficiency requirements, the rectifier 101 is turned off (the dotted line on the right side of the rectifier 101 in FIG. 1 indicates off), and the alternating current voltage input from the mains supply 100 is output to the load 105 after being bypassed by the SCR solid-state switch 102. In the high-efficiency mode, the inverter can still perform high-frequency on-off through pulse-width modulation instructions, to generate a corresponding modulation waveform based on waveform distortion on the load side and add the modulation waveform to a bypass to be input to the load side, so that a voltage waveform on the power grid side approaches a perfect or ideal waveform, to reduce or avoid harmonic pollution on the power grid.

However, an existing control method for the waveform distortion has a low response speed, poor stability, and a narrow adaptation range.

SUMMARY

To resolve the foregoing technical problems, a first aspect of the present invention provides a harmonic reduce control system for controlling an inverter connected between a direct current bus and a load, the inverter having an inverter topology composed of transistors. The harmonic reduce control system includes:

a phase-locked loop controller, a voltage sum loop controller, a repetitive controller, a current loop controller, and a harmonic obtaining module, where the harmonic obtaining module detects a harmonic value of a load current from a load side;

when a power grid and the load are directly connected in a bypass mode, the load current is equal to a sum of an inverter output current and a power grid current;

the harmonic reduce control system is configured to generate an inverter current reference value based on a first current value output by the voltage sum loop controller and the harmonic value, the phase-locked loop controller calculates a real-time frequency value based on a voltage of the power grid, the repetitive controller obtains, through calculation, a repetitive controller output value based on the inverter current reference value, the inverter output current used as a negative feedback, and the real-time frequency value output by the phase-locked loop controller, and the current loop controller outputs a first duty cycle based on the repetitive controller output value; and the harmonic reduce control system controls a transistor of the inverter based on the first duty cycle to limit the inverter output current, so that harmonics of the power grid current in the bypass mode are reduced.

Preferably, the harmonic reduce control system further includes a voltage difference loop controller.

The voltage sum loop controller outputs a second current value based on a bus voltage reference value and a bus voltage that is used as a negative feedback.

The harmonic reduce control system is configured to:

obtain a $\alpha/\beta$ coordinate axis current reference value based on the second current value and a weight value between an alternating current voltage and a standard sine voltage;

obtain, through the voltage difference loop controller, a $\gamma$ coordinate axis current reference value based on a voltage difference loop reference value of bus positive and negative sides and a voltage amplitude difference of the bus positive and negative sides that is used as a negative feedback; and generate the inverter current reference value based on the $\alpha/\beta$ coordinate axis current reference value, the $\gamma$ coordinate axis current reference value, and the harmonic value.

Preferably, the phase-locked loop controller of the harmonic reduce control system is a decoupled dual synchronous reference frame (DDSRF) phase-locked loop controller.

Preferably, the decoupled dual synchronous reference frame phase-locked loop controller of the harmonic reduce control system is configured to be able to obtain voltage values $V_{dqo}^+$ and $V_{dqo}^-$ in a dqo positive sequence rotating reference frame and a dqo negative sequence rotating reference frame, and obtain, through calculation, an inverter voltage sinusoidal amplitude and a phase-locked loop controller forward gain coefficient based on the voltage values, where the phase-locked loop controller forward gain coefficient is used to calculate the real-time frequency value.

Preferably, the repetitive controller of the harmonic reduce control system is described by using the following mathematical models:

$$D_{RP}(z) = \frac{z^{-N}}{1 - Q(z)z^{-N}} S(z)$$

-continued $$N = \frac{1}{T_s}/f_{inv}$$

N is a carrier-to-signal ratio, Q(z) is a gain output by a discrete domain positive feedback transfer function, S(z) is a discrete domain filter transfer function, $z^{-N}$ is an N-sample delay element, $T_s$ is a control period of the inverter, and $f_{inv}$ is the real-time frequency value.

Preferably, the discrete domain filter transfer function S(z) of the harmonic reduce control system is an analog Bessel function, and is described by using the following mathematical model:

$$S(s) = \frac{b_0 s^2 + b_1 s + b_2}{s^2 + a_1 s + a_2}$$

$b_0$, $b_1$, and $b_2$ are zero polynomial coefficients of a filter, and $a_1$ and $a_2$ are pole polynomial coefficients of the filter.

Preferably, the harmonic reduce control system further includes a feed-forward transfer function module, where the feed-forward transfer function module is configured to output a feed-forward duty cycle of a power grid voltage based on the power grid voltage; and the harmonic reduce control system generates a second duty cycle based on a sum of the first duty cycle and the feed-forward duty cycle, and the second duty cycle is used to replace the first duty cycle to control the transistor of the inverter to limit the inverter output current, so that the harmonics of the power grid current in the bypass mode are reduced.

Preferably, the current loop controller of the harmonic reduce control system is a dual-zero dual-pole type current loop controller, and a transfer function of the dual-zero dual-pole type current loop controller may be described by using the following mathematical model in a continuous domain:

$$D_i(s) = K_{fw\_i} \frac{\tau_a s + 1}{s} \frac{\tau_b s + 1}{\tau_c s + 1}$$

$K_{fw\_i}$ is a current loop feed-forward gain, $\tau_a$ and $\tau_b$ are current controller zero time constants a and b, and $\tau_c$ is a current controller pole time constant c.

A second aspect of the present invention provides an inverter connected between a direct current bus and a load. The inverter is a three-phase inverter and has the harmonic reduce control system according to the first aspect of the present invention.

A third aspect of the present invention provides an uninterruptible power supply. The uninterruptible power supply has the three-phase inverter according to the second aspect of the present invention, and the uninterruptible power supply directly supplies power from the power grid to the load in the bypass mode.

The harmonic reduce control system described in the present invention can reduce harmonic pollution of the power grid, and has a higher response speed, higher stability, and a wider adaptation range.

BRIEF DESCRIPTION OF THE DRAWINGS

The following further describes the embodiments of the present invention with reference to the accompanying drawings, where.

DETAILED DESCRIPTION

To make the objectives, technical solutions, and advantages of the present invention clearer, the following further describes the present invention in detail through the embodiments with of the reference to the accompanying drawings.

An uninterruptible power supply and a harmonic reduce control system for controlling the uninterruptible power supply are described in accordance with a preferred embodiment of the present invention.

Figure 1:
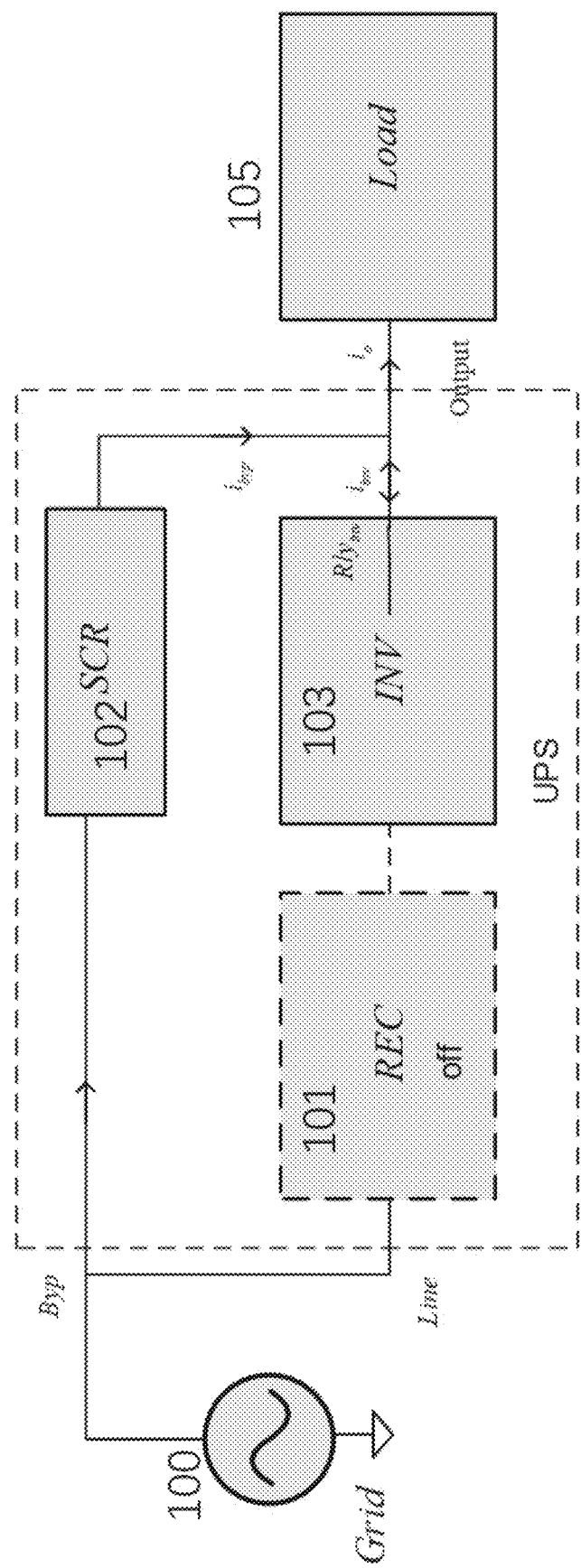
FIG. 1 shows a brief schematic block diagram of an uninterruptible power supply in the conventional technology.
Figure 2:
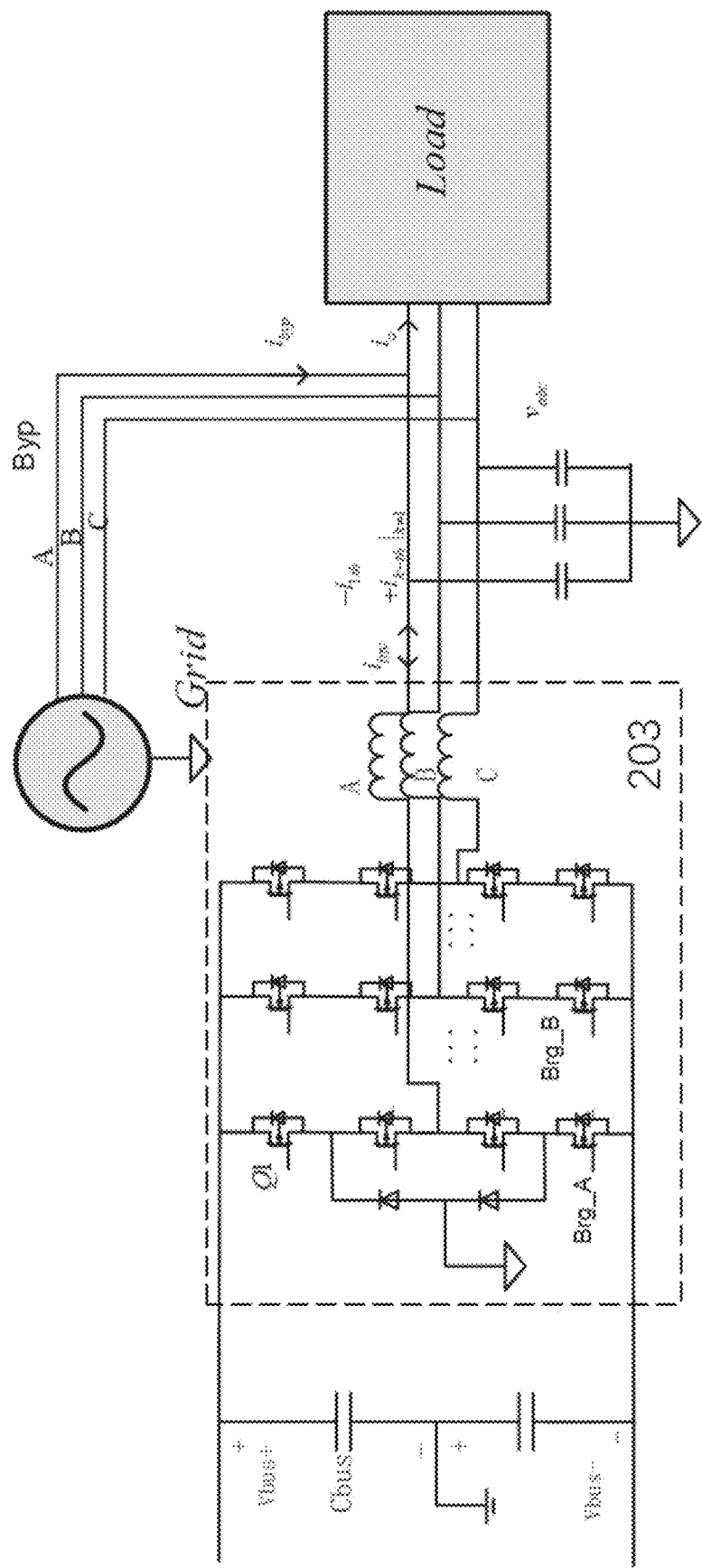
FIG. 2 shows a brief schematic diagram of an uninterruptible power supply according to a preferred embodiment of the present invention.

FIG. 2 shows a brief schematic diagram of the uninterruptible power supply according to the preferred embodiment. Compared with an inverter 103 shown in FIG. 1, FIG. 2 shows an inverter 203 of the uninterruptible power supply 2 and a more detailed arrangement between the inverter and positive and negative buses, a mains input, and a load. For ease of highlighting, other parts of the uninterruptible power supply 2 are omitted in FIG. 2.

The inverter 203 in FIG. 2 is configured as a three-phase three-level type-I inverter topology, and the uninterruptible power supply is configured to be in a high-efficiency mode, so that a power grid voltage is directly connected to the load through a bypass. Although FIG. 2 shows a three-phase inverter topology, in other embodiments, a single-phase or multi-phase inverter circuit can still use the harmonic control method described in the present invention.

A load current in FIG. 2 is equal to a sum of a bypass current and an inverter current.

Figure 3:
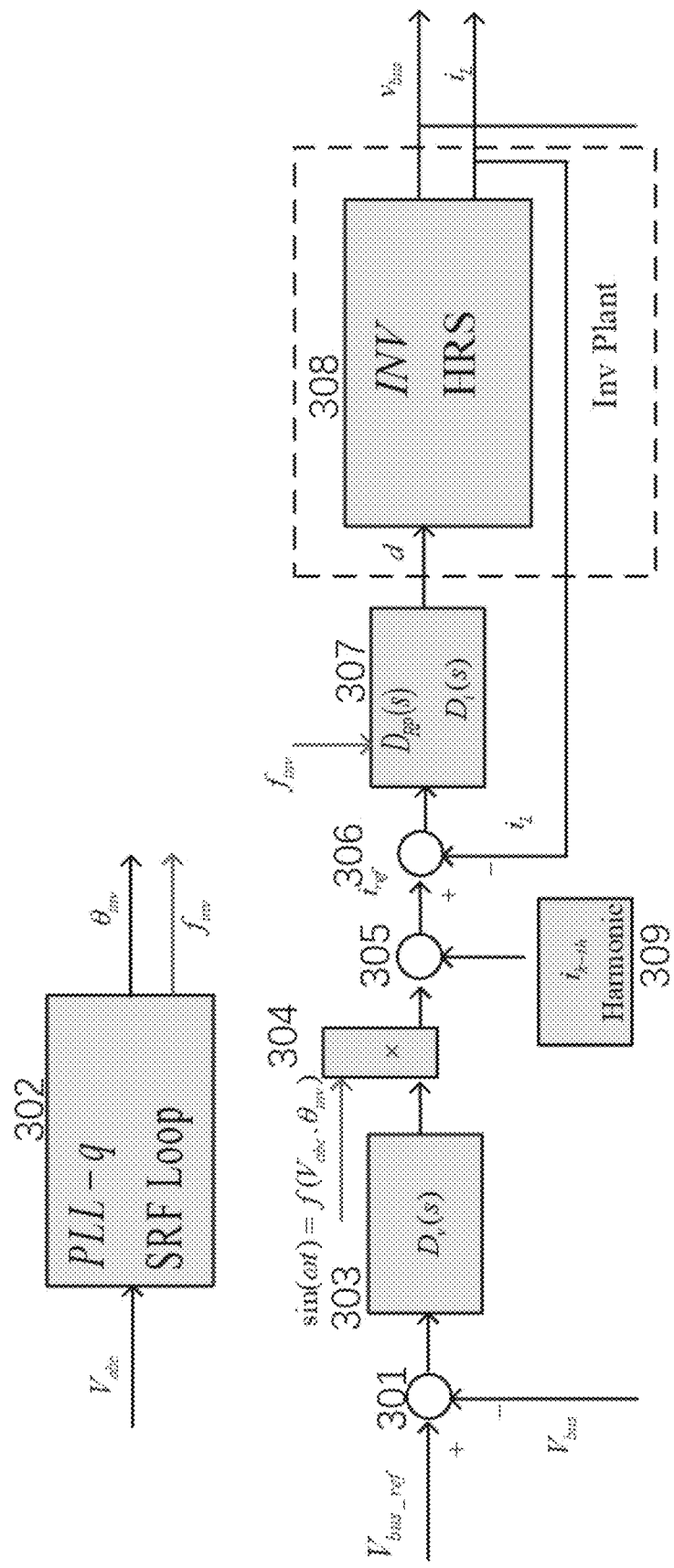
FIG. 3 shows a harmonic reduce control system 3 for controlling four transistors of a type-I inverter structure of each phase of the uninterruptible power supply 2 shown in FIG. 2 to perform high-frequency pulse width modulation in the preferred embodiment.

FIG. 3 shows a harmonic reduce control system 3 for controlling four transistors of a type-I inverter structure of each phase of the uninterruptible power supply 2 shown in FIG. 2 to perform high-frequency pulse width modulation in the preferred embodiment. The harmonic reduce control system is used to reduce or avoid harmonic pollution input to the power grid.

As shown in FIG. 3, the harmonic reduce control system 3 includes a subtractor 301, a phase-locked loop controller 302, a direct current bus voltage sum loop controller 303, a multiplier 304, an adder 305, a subtractor 306, a repetitive control module 307, and a harmonic generation module 309. FIG. 3 further shows a preset inverter hardware model 308 configured to simulate a real inverter 203. In a real circuit arrangement, the inverter hardware model 308 is the inverter 203 of the uninterruptible power supply 20 shown in FIG. 2. The harmonic generation module 309 is configured to obtain harmonics of various orders in a load current.

In FIG. 3, the phase-locked loop controller 302 is shown separately independent of a route below. External output parameters of the harmonic reduce control system 3 are abc three-phase inverter output voltage $V_{abc}$ and a direct current bus voltage reference value $V_{bus\_rf}$ (or $V_{bus\_ref}$). The voltage $V_{abc}$ is output to the phase-locked loop controller 302. The phase-locked loop controller 302 outputs an inverter voltage phase $\theta_{inv}$ and an inverter voltage frequency $f_{inv}$ based on the voltage $V_{abc}$. The inverter voltage phase $\theta_{inv}$ is used to obtain a sine reference table $\sin(\omega t)$ through calculation, and the inverter voltage frequency $f_{inv}$ is output to the repetitive control module 307.

In the control route shown below in FIG. 3, the subtractor 301 is configured to perform subtraction between the direct current bus voltage reference value $V_{bus\_rf}$ and a direct current bus voltage $V_{bus}$ ($V_{bus}$ is not an external output parameter of the harmonic reduce control system 3 but is used as an internal negative feedback) that are input to the subtractor, and a calculation result of the subtractor 301 is processed as a first current value by the direct current bus voltage sum loop controller ("voltage sum loop controller" for short) 303 and the first current value is input to the multiplier 304. The multiplier 304 receives the first current value and the sine reference table $\sin(\omega t)$, multiplies the first current value and the sine reference table to obtain a fundamental frequency current reference value, and the adder 305 accumulates the fundamental frequency current reference value and a k-order current harmonic output by the harmonic generation module 309 to obtain an inverter current reference value $i_{ref}$, wherein the sine reference table $\sin(\omega t)=f(V_{abc}, \theta_{inv})$, f is a function based on the inverter voltage $V_{abc}$ and the inverter voltage phase $\theta_{inv}$.

The subtractor 306 performs subtraction between the inverter current reference value $i_{ref}$ and an inductor current $i_L$ (i.e., $i_L$ is used as a negative feedback), and inputs a result to the repetitive control module 307. The repetitive control module 307 includes a current repetitive controller $D_{RP}(s)$ and a current loop controller $D_i(s)$. The repetitive control module 307 calculates and outputs a duty cycle d, and the duty cycle d is input to the inverter hardware model 308 (shown by a dotted line box in the figure). The inverter hardware model 308 thus obtains a modulated bus voltage $V_{bus}$ and the inductor current $i_L$ ($i_L$ is the inverter current $I_{inv}$ in FIG. 2) by means of pulse width modulation. The inverter hardware model 308 is a hardware modeling of the inverter 203, and includes a state equation and an output equation of the inverter. The harmonic reduce control system 3 in this embodiment considers that after being configured to be in the high-efficiency mode, the uninterruptible power supply 20 is likely to experience a shift of a fundamental frequency position due to fluctuations of power grid utility frequency signal when the fundamental frequency position is relatively normal, which can further result in misalignment of a predetermined fixed regulation mode of a controller. Therefore, the system is configured to obtain a real-time updated inverter voltage frequency $f_{inv}$ through the phase-locked loop controller 302 and output the real-time updated inverter voltage frequency to the repetitive control module 307, thereby improving accuracy of a dynamic response of the repetitive control module 307, so that the system has a wide power grid frequency matching range, and can be better adapted to a power grid system under various levels of fluctuations, thereby ensuring reliability of the uninterruptible power supply under various complex conditions.

Figure 4:
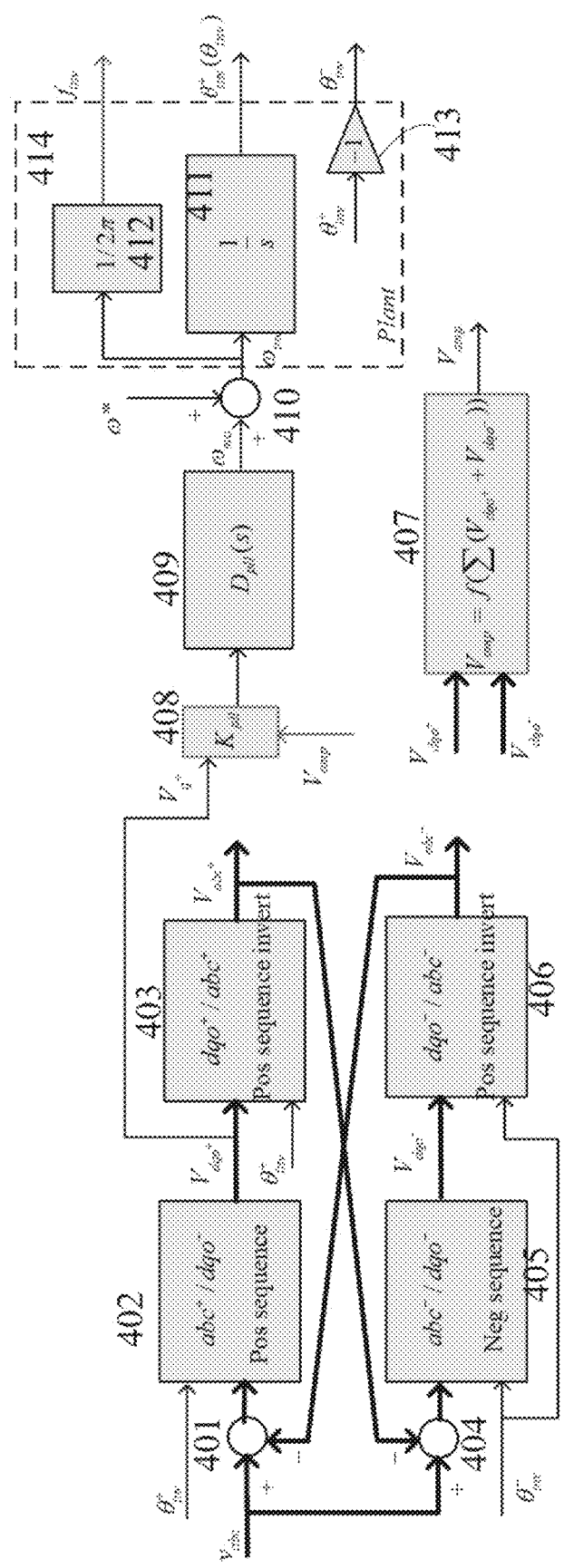
FIG. 4 shows a partial schematic diagram of a harmonic reduce control system according to another preferred embodiment of the present invention.

FIG. 4 shows a partial schematic diagram of a harmonic reduce control system according to another preferred embodiment of the present invention. For brief illustration, FIG. 4 shows only details of arrangement of a phase-locked loop controller 40 of the harmonic reduce control system 4. The remaining modules of the harmonic reduce control system 4 described in this embodiment are similar to those of the harmonic reduce control system 3 shown in FIG. 3, and are not shown again.

As shown in FIG. 4, the phase-locked loop controller 40 is configured to have a decoupled dual synchronous reference frame (DDSRF) phase-locked loop topology. The phase-locked loop controller 40 includes a subtractor 401, an inverter voltage positive sequence reference frame conversion module 402, an inverter voltage positive sequence reference frame inverse conversion module 403, a subtractor 404, an inverter voltage negative sequence reference frame conversion module 405, an inverter voltage negative sequence reference frame inverse conversion module 406, an inverter voltage sinusoidal amplitude calculation module 407, a phase-locked loop controller forward gain coefficient module 408, a phase-locked loop 409, an adder 410, an integrator transfer function module 411, a frequency obtaining function module 412, and an inverse phase calculation unit 413. The foregoing modules 411 to 413 are collectively referred to as a physical part 414 of an algorithm.

The subtractor 401 receives an inverter abc phase voltage $V_{abc}$ and a voltage value $V_{abc}^-$ in an abc negative sequence reference frame that is used as a negative feedback, and outputs a result of subtraction between the both.

The inverter voltage positive sequence reference frame conversion module 402 receives the output of the subtractor 401 and an inverter voltage negative sequence phase $\theta_{inv}^-$ that is used as a negative feedback. Therefore, the inverter voltage positive sequence reference frame conversion module 402 converts $V_{abc}$ from an abc positive sequence reference frame into a voltage value $V_{dqo}^+$ in a dqo positive sequence rotating reference frame, where $V_{dqo}^+$ is a positive sequence d-axis/q-axis/o-axis value. The inverter voltage positive sequence reference frame inverse conversion module 403 receives inverter voltage positive sequence phases $\theta_{inv}^+$ and $V_{dqo}^+$, and converts $V_{dqo}^+$ from the dqo positive sequence rotating reference frame into a voltage value $V_{abc}^+$ in the abc positive sequence reference frame.

The subtractor 404 receives the inverter abc phase voltage $V_{abc}$ and the voltage value $V_{abc}^-$ in the abc negative sequence reference frame that is used as a negative feedback. The inverter voltage negative sequence reference frame conversion module 405 receives the output of the subtractor 404 and an inverter voltage positive sequence phase $\theta_{inv}^+$ that is used as a negative feedback. Therefore, the inverter voltage negative sequence reference frame conversion module 405 converts $V_{abc}$ from an abc negative sequence reference frame into a voltage value $V_{dqo}^-$ in a dqo negative sequence rotating reference frame, where $V_{dqo}^-$ is a negative sequence d-axis/q-axis/o-axis value. The inverter voltage negative sequence reference frame inverse conversion module 406 receives inverter voltage negative sequence phases $\theta_{inv}^-$ and $V_{dqo}^-$, and converts $V_{dqo}^-$ from the dqo negative sequence rotating reference frame into a voltage value $V_{abc}^-$ in the abc negative sequence reference frame. The thick lines marked in FIG. 4 indicate that variables in three phases are converted together.

The inverter voltage sinusoidal amplitude calculation module 407 receives the voltage values $V_{dqo}^+$ and $V_{dqo}^-$ in the dqo positive and negative sequence rotating reference frames, obtains an inverter voltage sinusoidal amplitude $V_{amp}$ through calculation, and inputs an obtained phase-locked loop controller forward gain coefficient $K_{pll}$ to the phase-locked loop controller forward gain coefficient module 408. Calculation formulas are as follows:

$$V_{amp} = \|V_{dqo^+} + V_{dqo^-}\| = \sqrt{(V_{d^+}^2 + V_{q^+}^2 + V_{o^+}^2) + (V_{d^-}^2 + V_{q^-}^2 + V_{o^-}^2)}$$

$$K_{pll} = V_{amp}$$

An inverter positive sequence rotating reference frame voltage positive sequence q axis value $V_q^+$ in $V_{dqo}^+$ output by the inverter voltage positive sequence reference frame conversion module 402 is processed by the phase-locked loop controller forward gain coefficient module 408, then is output to the phase-locked loop 409, and is processed, and an angular frequency value $\omega_{mo}$ is output. The angular frequency value $\omega_{mo}$ is used to indicate a deviation between an actual inverter angular frequency and a feed-forward angular frequency value $\omega^*$ set by a phase-locked loop with an ideal power grid frequency, and $\omega^*$ and $\omega_{mo}$ are added together through the adder 410, and the sum is output to the physical part 414 of the algorithm as an updated inverter voltage angular frequency value $\omega_{inv}$.

The dotted line box part represents the physical part 414 of the algorithm, and the updated inverter voltage angular frequency value $\omega_{inv}$ output by the adder 410 is input to the integrator transfer function module 411 to obtain a inverter voltage positive sequence phase $\theta_{inv}^+$, where is a differential operator; and the angular frequency value $\omega_{inv}$ is further input to the frequency obtaining function module 412, where the angular frequency value $\omega_{inv}$ is divided by $2\pi$ to obtain an inverter voltage frequency $f_{inv}$. The inverter voltage positive sequence phase $\theta_{inv}^+$ obtained by the integrator transfer function module 411 further passes through the inverse phase calculation unit 413 to obtain the inverter voltage negative sequence phase $\theta_{inv}^-$.

The physical part 414 of the algorithm may be described by using the following mathematical models:

$$\begin{cases} G_{pll\_ol}(s) = D_{pll}(s)G_{pll}(s) \\ G_{pll\_cl}(s) = \dfrac{G_{pll\_ol}(s)}{1 + G_{pll\_ol}(s)} \end{cases}$$

-continued
$$\theta_{inv}(s) = \theta_{grid}(s) + \Delta\theta_{rf}(s)G_{pll\_cl}(s)$$

$$\omega_{inv} = \frac{d}{dt}\theta_{inv}; f_{inv} = \frac{1}{2\pi}\omega_{inv}$$

$$\begin{cases} \Delta\theta(s) = \theta_{inv}(s) - \theta_{grid}(s) \\ \Delta\theta(s) = \Delta\theta_{rf}(s)G_{pll\_cl}(s) \\ \Delta\theta_{rf}(s) = 0 \end{cases}$$

$D_{pll}(s)$ has:

$$D_{pll}(s) = K_{pll}K_{fw\_pll}\left(1 + \frac{1}{T_i s}\right)$$

and is a phase-locked loop controller model.

$G_{pll}(s)$ is a phase-locked loop controlled object transfer function, $G_{pll\_ol}(s)$ is a phase-locked loop open-loop system transfer function, $G_{pll\_cl}(s)$ is a phase-locked loop closed loop system transfer function, $\theta_{inv}(s)$ is an inverter voltage phase transfer function, $\theta_{grid}(s)$ is a power grid voltage phase transfer function, $\Delta\theta_{rf}(s)$ is a reference value transfer function of a phase difference between the inverter and the power grid, $\Delta\theta(s)$ is a transfer function of a phase difference between an inverter phase and a power grid phase, Winv is an inverter voltage angular frequency, $d/dt\theta_{inv}$ is a derivative of the inverter voltage phase, $T_i s$ is a control period of the inverter, and $f_s$ is a control frequency of the inverter.

In the harmonic reduce control system described in this embodiment, the decoupled dual synchronous reference frame phase-locked loop controller uses a positive and negative amplitude normalize unitization gain, a phase-locked loop control loop gain is compatible with a large-range voltage power grid and a phase unbalanced power grid, and a dynamic response to a power grid frequency fluctuation is faster, thereby effectively maintaining consistency between a traversal frequency and gain margin and a rated voltage, and ensuring high accuracy of power factor compensation of the harmonic reduce control system.

Figure 5:
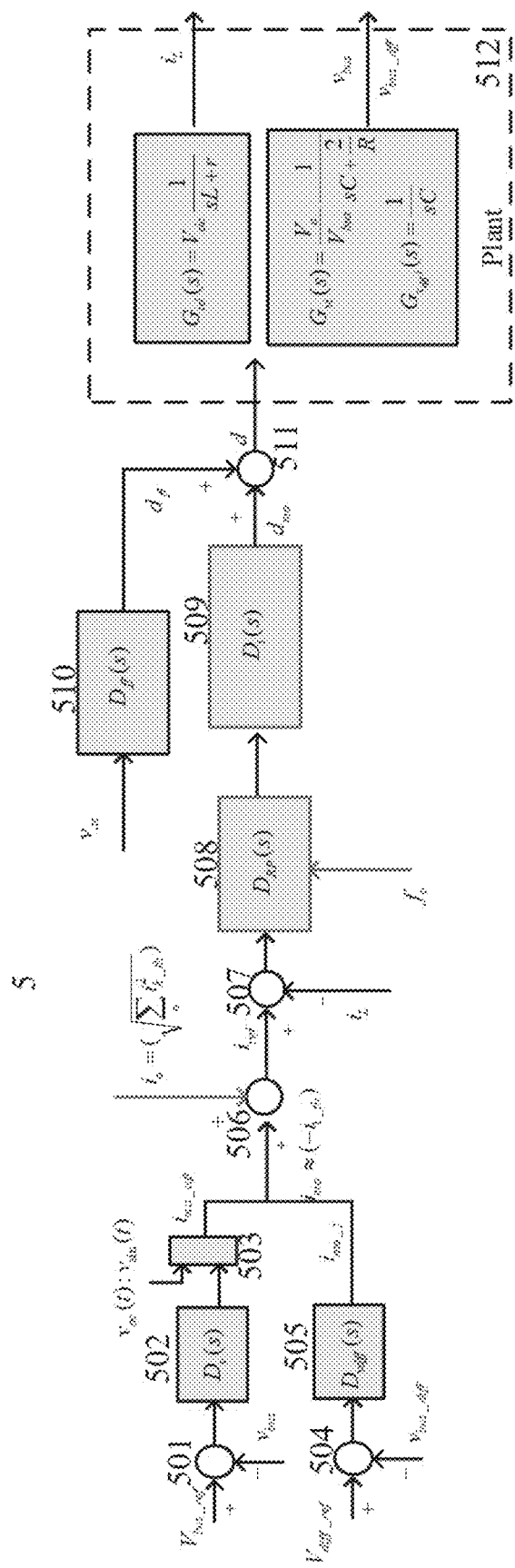
FIG. 5 shows a partial schematic diagram of a harmonic reduce control system according to still another preferred embodiment of the present invention.

FIG. 5 shows a partial schematic diagram of a harmonic reduce control system according to still another preferred embodiment of the present invention. For brief illustration, a phase-locked loop controller providing a real-time updated inverter voltage frequency $f_{inv}$ (shown as an output voltage frequency $f_0$ in FIG. 5, both corresponding to the same physical quantity) to a repetitive control module is omitted in FIG. 5.

The harmonic reduce control system 5 shown in FIG. 5 includes a subtractor 501, a direct current bus voltage sum loop controller 502, a multiplier 503, a subtractor 504, a direct current bus voltage difference loop controller 505, an adder 506, a subtractor 507, a repetitive controller 508, a current loop controller 509, a feed-forward transfer function module 510 of a power grid voltage, and an adder 511.

The subtractor 501 performs subtraction between an input direct current bus voltage reference value $V_{bus\_rf}$ and a positive and negative bus voltage $V_{bus}$ across an inverter, and outputs a result to the direct current bus voltage sum loop controller 502 that outputs a second current value to the multiplier 503 after processing, and the multiplier 503 further receives a weight value $v_{ac}(t):v_{sin}$ between an alternating current voltage input by the phase-locked loop controller and a standard sine voltage, multiplies the weight value by the second current value, and outputs a result as a $\alpha/\beta$ coordinate axis current reference value $i_{mo\_\alpha\beta}$ of a voltage sum loop output. The subtractor 504 performs subtraction between an input voltage difference loop reference value $V_{diff\_ref}$ of positive and negative sides of a direct current bus and a voltage amplitude difference $V_{bus\_diff}$ of the positive and negative sides of the direct current bus connected to the inverter and outputs a result to the direct current bus voltage difference loop controller 505 that outputs a processing result as a γ coordinate axis current reference value $i_{mo\_\gamma}$ of a voltage difference loop output. $i_{mo\_\alpha\beta}$ and $i_{mo\_\gamma}$ are combined as a fundamental frequency current reference value $i_{mo}$ input to the adder 506, and the adder 506 further receives an accumulated value of all n-orders harmonics output by a harmonic generation module, and adds the accumulated value and a fundamental frequency current together to output an inverter current reference value $i_{ref}$. Calculation formulas are as follows:

$$i_{ref} = i_{mo} + i_o$$

$$i_o = \sqrt{\sum_n i_{k\_th}^2},$$

$i_{k\_th}$ represents the kth harmonic of a current.

The subtractor 507 performs subtraction between the inverter current reference value $i_{ref}$ and an inductor current $i_L$ and inputs a result to the repetitive control module 508, the repetitive control module 508 further receives a real-time updated inverter voltage frequency $f_0$ provided by the phase-locked loop controller and inputs a calculation result to the current loop controller 509; and the current loop controller 509 outputs a current loop duty cycle $d_{mo}$ to the adder 511 based on the calculation result. The feed-forward transfer function module 510 of the power grid voltage outputs, to the adder 511, a feed-forward duty cycle $d_{ff}$ of the power grid voltage output based on an input power grid alternating current voltage, and the adder 511 adds the current loop duty cycle $d_{mo}$ and the feed-forward duty cycle $d_{ff}$ together to output a total duty cycle to the inverter hardware model 512. The inverter hardware model 512 may be understood as a controlled object of a harmonic reduce system, is a mathematical model preset in simulation to simplify calculation, and is configured to simulate outputs of the inductor current $i_L$ correspondingly output by a correspondingly controlled real inverter, the bus voltage $V_{bus}$ (a voltage difference between the positive and negative sides of the bus), and a difference $V_{bus\_diff}$ between voltage amplitudes of the positive and negative sides of the bus. When the apparatus in this embodiment is applied to control of the uninterruptible power supply shown in FIG. 2, the foregoing inverter hardware model 512 outputs a value generally obtained by a voltage or current sensor arranged in the uninterruptible power supply, which is known to persons of ordinary skill in the art. Details are not described herein again.

Figure 6:
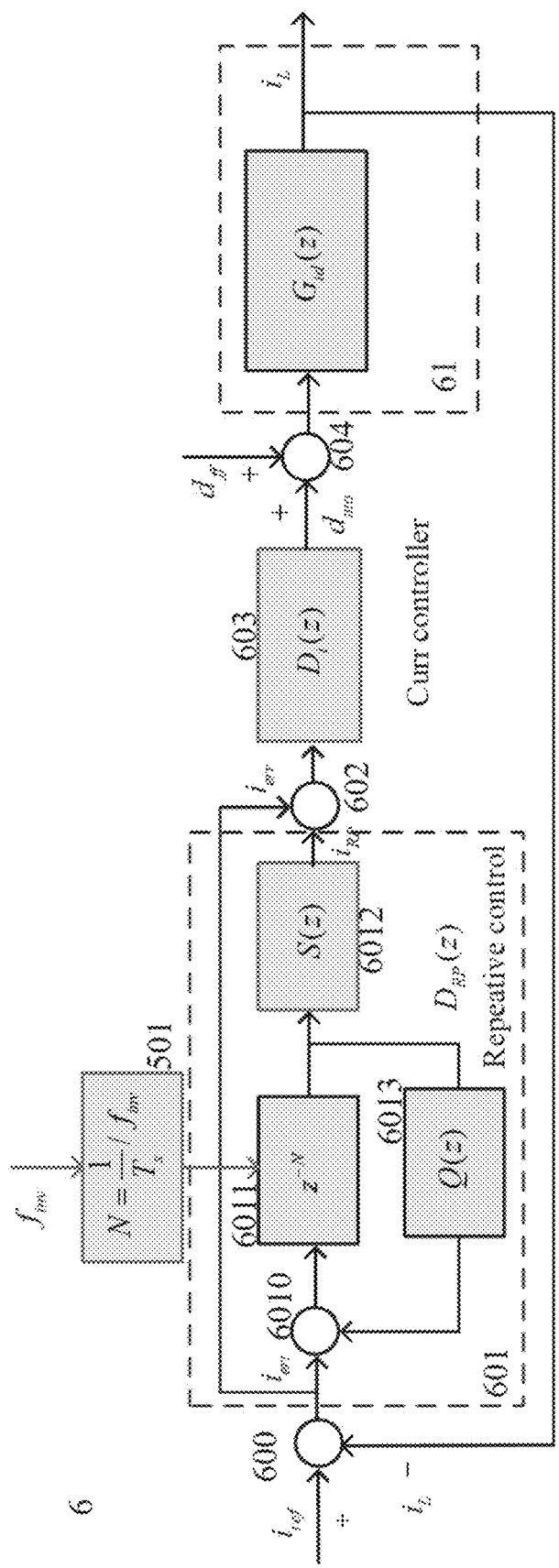
FIG. 6 shows a partial schematic diagram of a harmonic reduce control system according to still another preferred embodiment of the present invention.

FIG. 6 shows a partial schematic diagram of a harmonic reduce control system according to still another preferred embodiment of the present invention. For brief description, FIG. 6 shows a repetitive control module 60 of the harmonic reduce control system 6 and details of arrangement of the repetitive control module for controlling a current part of an inverter hardware model 61. The remaining modules of the harmonic reduce control system 6 described in this embodiment are similar to those of the harmonic reduce control system 3 shown in FIG. 3, and are not shown again.

As an example, mathematical symbols shown in FIG. 6 are marked as representations in a discrete domain (independent variables in parentheses are replaced by discrete variables z from continuous variables s), but can also be applied in a continuous domain. The repetitive control module 60 includes a repetitive controller 601, an adder 602, a current loop controller 603, and an adder 604. The repetitive controller 601 includes an adder 6010, an N-sample delay element 6011, a discrete domain filter transfer function 6012, and a discrete domain positive feedback transfer function 6013.

Similar to that shown in FIG. 3, the subtractor 600 performs subtraction between an inverter current reference value $i_{ref}$ and an inductor current $i_L$ to obtain a result of a difference $i_{err}$ between the current reference value and a feedback value, and inputs the result to the adder 6010 of the repetitive controller 601.

The adder 6010 receives and calculates a sum of $i_{err}$ output by the subtractor 600 and a value that is output by the discrete domain positive feedback transfer function 6013 as a positive feedback, and outputs the sum to the N-sample delay element 6011, a result obtained after processing is separately output to the discrete domain filter transfer function 6012 and the discrete domain positive feedback transfer function 6013, and a current value output by the discrete domain filter transfer function 6012 is used as an output current value $i_{RP}$ of the repetitive controller 601.

The adder 602 adds the current value $i_{RP}$ output by the repetitive controller 601 and $i_{err}$ output by subtractor 600 together, and outputs the sum to the current loop controller 603, and the current loop controller 603 thus outputs a current loop duty cycle value $d_{mo}$. Similar to the embodiment shown in FIG. 5, there is further the feed-forward duty cycle $d_{ff}$ of the power grid voltage output by the feed-forward transfer function module 510 based on the input power grid alternating current voltage. The adder 604 adds the current loop duty cycle $d_{mo}$ and the feed-forward duty cycle $d_{ff}$ together to output a total duty cycle d as a control variable output to controlled hardware, namely, the inverter hardware model 61 (only a current harmonic reduce process is described in this embodiment, and for brief illustration, FIG. 6 shows only a current control part of the inverter hardware model, and a voltage control part is omitted). The current control part of the inverter hardware model 61 is controlled to output the inductor current $i_L$.

The repetitive controller 601 may be described by using the following mathematical models:

$$D_{RP}(z) = \frac{z^{-N}}{1 - Q(z)z^{-N}} S(z)$$

$$N = \frac{1}{T_s}/f_{inv}$$

N is a carrier-to-signal ratio, Q(z) is a gain (used as a positive feedback) output by the discrete domain positive feedback transfer function, S(z) is the discrete domain filter transfer function, $z^{-N}$ is the N-sample delay element, and $T_s$ is a control period of the inverter.

The filter is an analog Bessel filter, and the filter transfer function S(z) is described by using the following function in the continuous domain (the same applies in the discrete domain described in this embodiment):

$$S(s) = \frac{b_0 s^2 + b_1 s + b_2}{s^2 + a_1 s + a_2}$$

$b_0$, $b_1$, and $b_2$ are zero polynomial coefficients of the filter, and $a_1$ and $a_2$ are pole polynomial coefficients of the filter.

The characteristic of the analog Bessel filter is that a group delay within an entire pass band is almost constant, so that a waveform of a filtered signal in the pass band can be preserved. An optimal bandwidth can be obtained by adjusting the foregoing function S(s).

A current loop controller transfer function of the current loop controller 603 is a ddual-zero dual-pole type transfer function, and may be described by using the following mathematical model in the continuous domain (the same applies in the discrete domain described in this embodiment):

$$D_i(s) = K_{fw\_i} \frac{\tau_a s + 1}{s} \frac{\tau_b s + 1}{\tau_c s + 1}$$

$K_{fw\_i}$ is a current loop feed-forward gain, $\tau_a$ and $\tau_b$ are current controller zero time constants a and b, and $\tau_c$ is a current controller pole time constant c.

A transfer function of the current control part of the inverter hardware model 61 may be described by using the following mathematical model in the continuous domain (the same applies in the discrete domain described in this embodiment):

$$\begin{cases} G_{i\_ol}(s) = (1 + D_{RP}(s))D_i(s)G_{id}(s) \\ G_{i\_cl}(s) = \dfrac{G_{i\_ol}(s)}{1 + G_{i\_ol}(s)} \end{cases}$$

$G_{i\_ol}(s)$ is an open-loop transfer function of a current loop, and $G_{i\_cl}(s)$ is a closed-loop transfer function of the current loop.

The current loop controller transfer function in this embodiment is a dual-zero dual-pole type transfer function, so that a phase lag caused by the repetitive controller is effectively reduced; and the current loop controller transfer function can ensure a more efficient dynamic response, sufficient phase and gain margins, and a better traversal frequency by cooperating with the analog Bessel filter.

Parameter selection values in the formulas provided in this embodiment may be specifically set based on an actual uninterrupted power supply, and changes made to the parameter selection values also fall within the protection scope of this application.

The inventor separately proves the technical effects of the present invention by using results of simulation and experimental tests.

Figure 7:
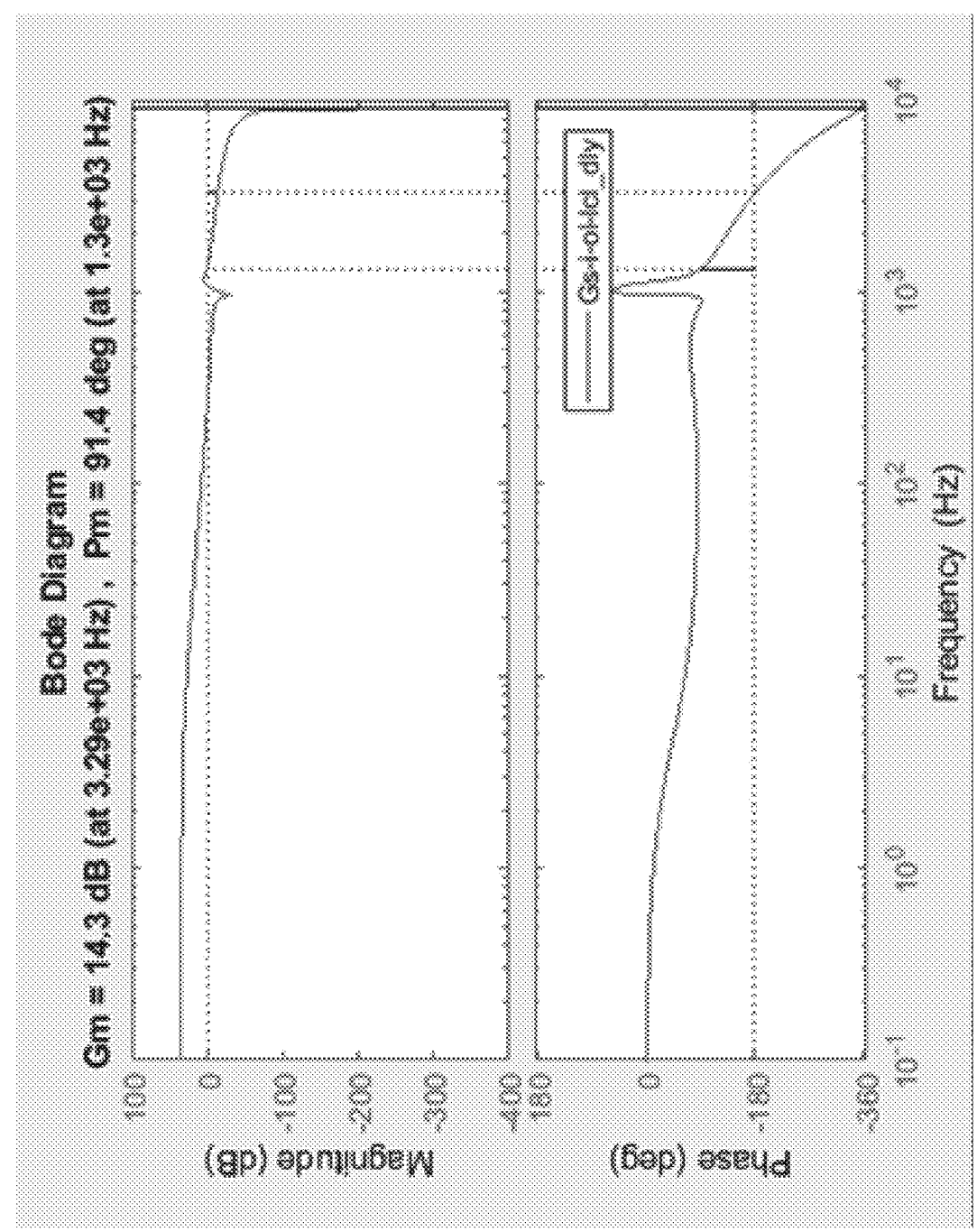
FIG. 7 and FIG. 8 show open-loop Bode diagrams corresponding to simulation results of a harmonic control system according to an embodiment.
Figure 8:
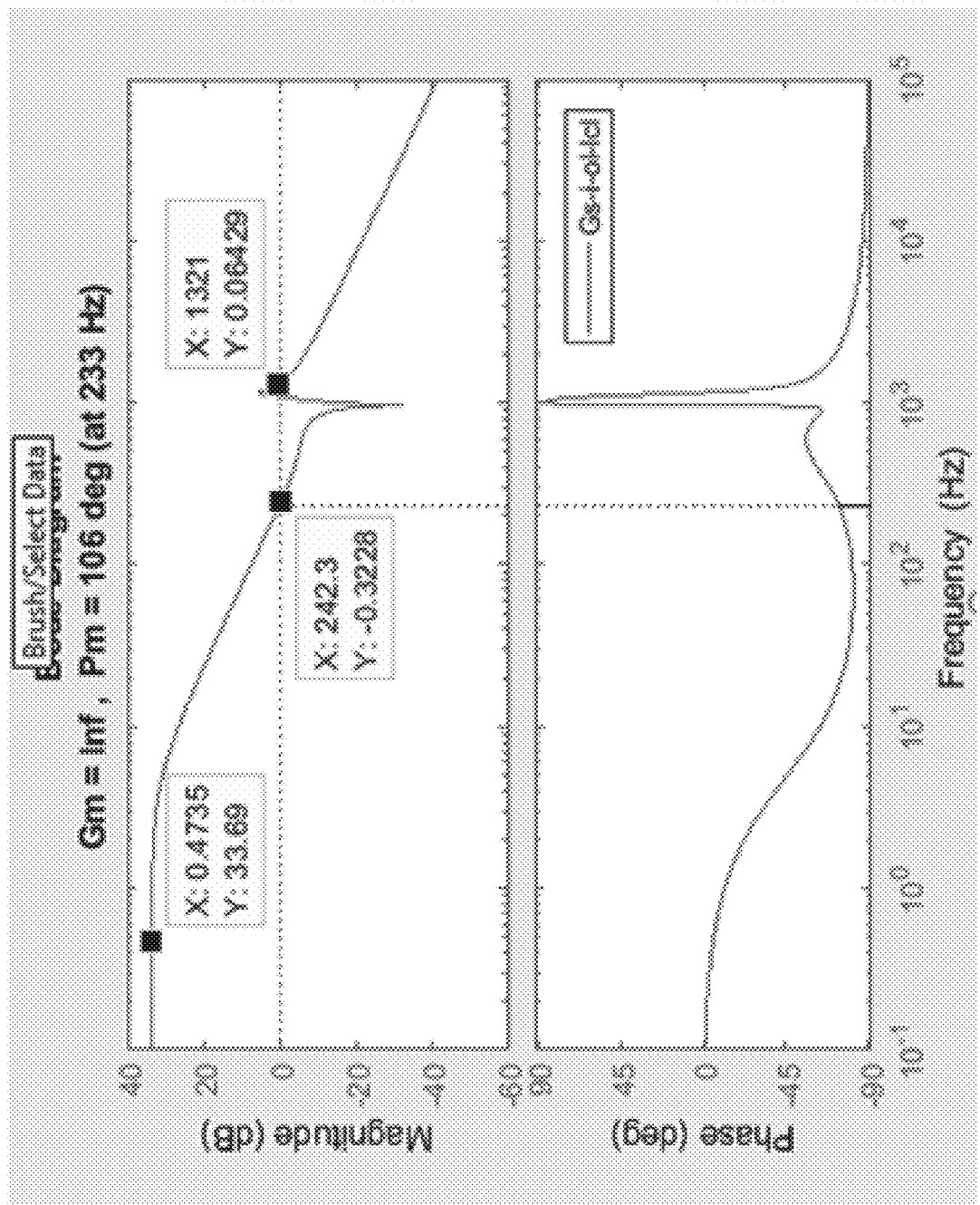

FIG. 7 and FIG. 8 show open-loop Bode diagrams corresponding to simulation results of a harmonic control system according to an embodiment. FIG. 7 shows a calculation result of a current loop. A loop traversal frequency is 1.3e+03 Hz, a phase margin (PM)=91.4 deg, and a gain margin (GM)=14.3 dB in the UPS field. FIG. 8 shows a calculation result of a voltage loop. A loop traversal frequency is 233 Hz, a phase margin (PM)=106 deg, and a gain margin (GM)=inf(infinity) in the UPS field. This current and voltage index indicates that harmonic reduce performance is greatly improved, and meets the conventional design requirements for stability and reliability in this field.

Figure 9:
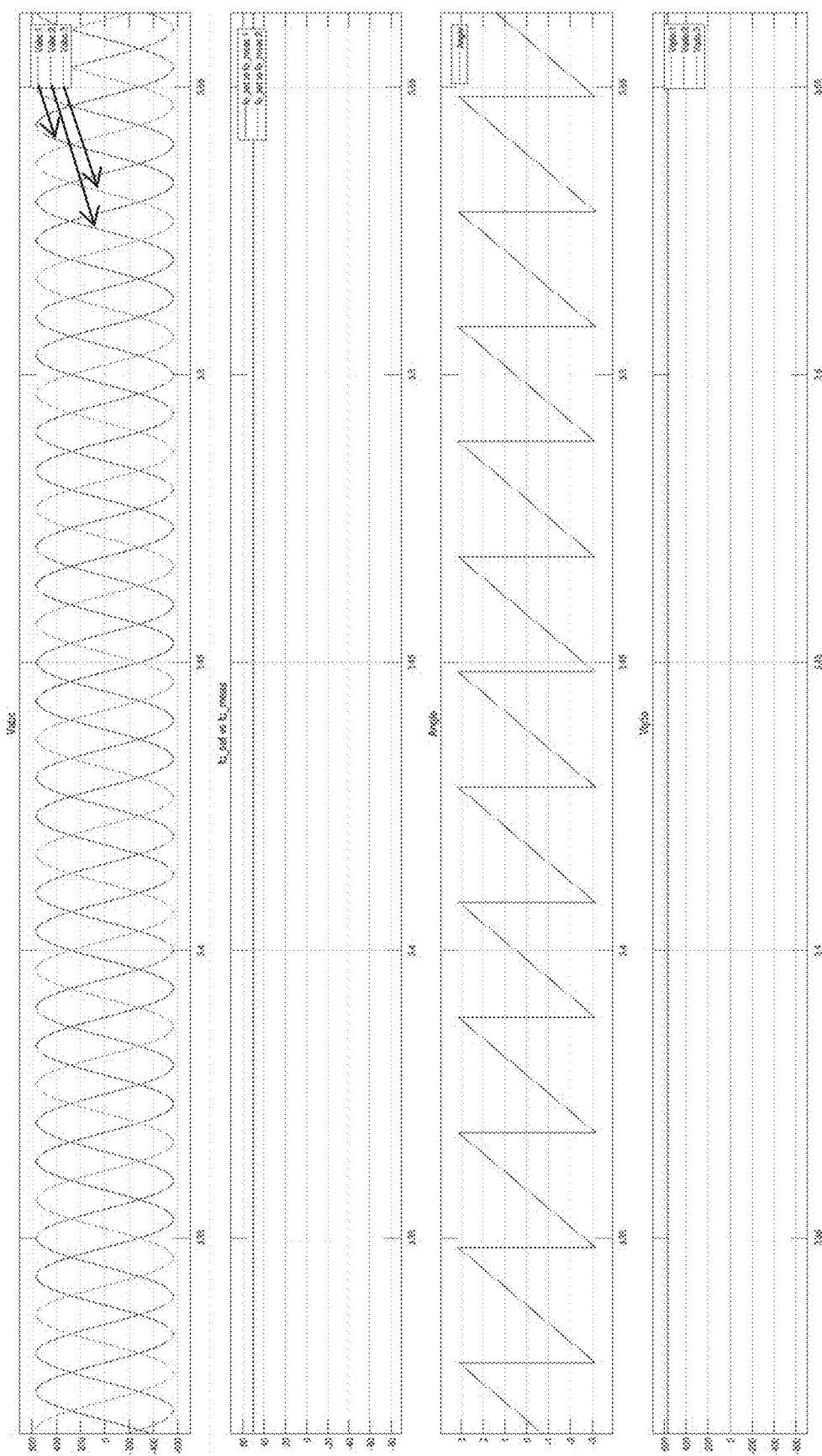
FIG. 9 and FIG. 10 show simulation results of a phase-locked loop controller.
Figure 10:
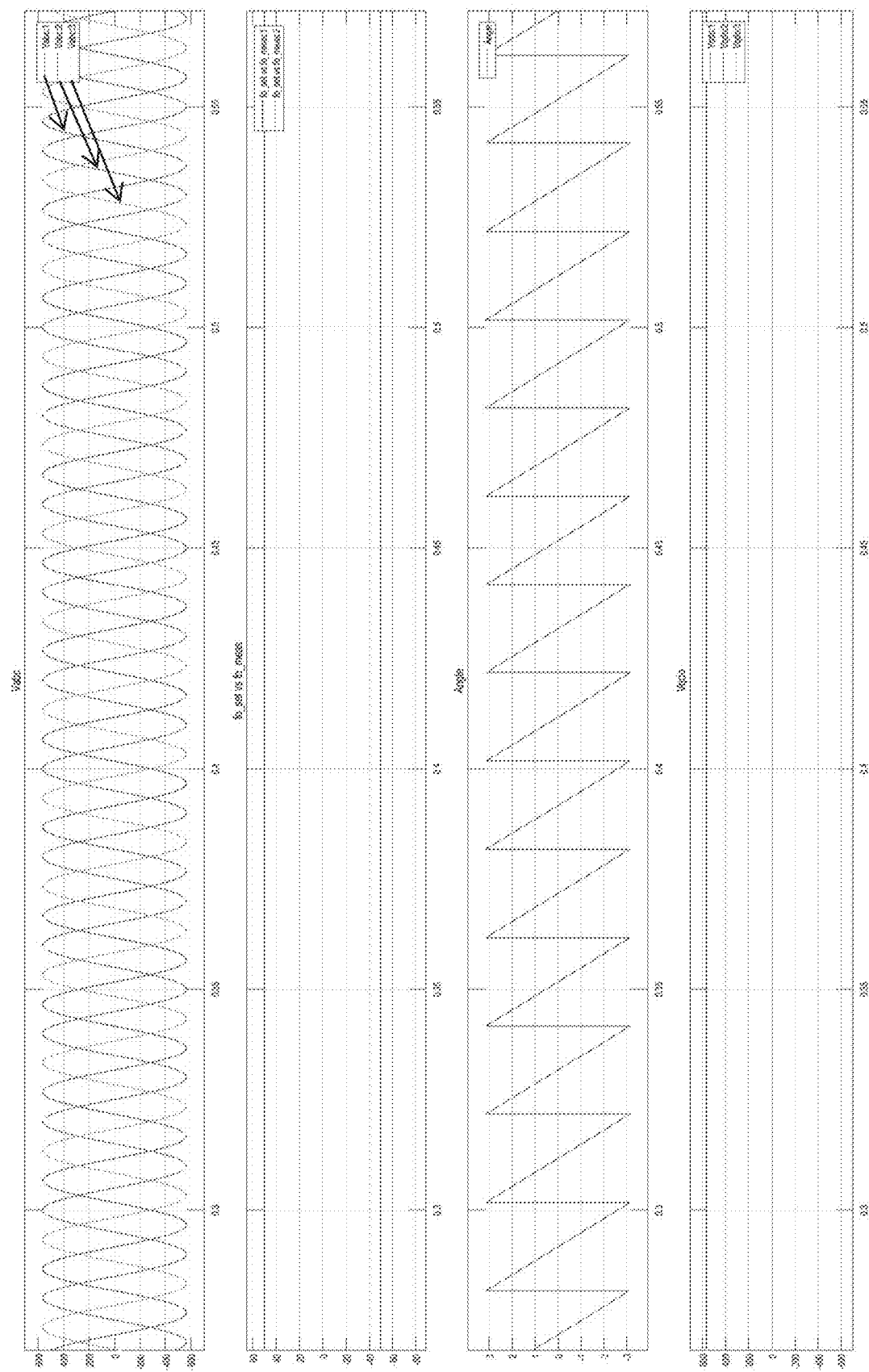

FIG. 9 and FIG. 10 show simulation results of a phase-locked loop controller.

From top to bottom, FIG. 9 sequentially shows an input voltage signal, a set value and a phase-locked value of an inverter frequency, an inverter voltage phase angle (from $-\pi$ to $\pi$), and a voltage value $V_{dqo}$ converted into a dqo rotating reference frame, which are of the phase-locked loop controller at a positive sequence three-phase inverter voltage. As shown in FIG. 9, high-precision phase locking can be implemented in the phase-locked loop controller described in this application at the positive sequence three-phase inverter voltage.

From top to bottom, FIG. 10 sequentially shows an input voltage signal, a set value and a phase-locked value of an inverter frequency, an inverter voltage phase angle (from $-\pi$ to $\pi$), and a voltage value $V_{dqo}$ converted into a dqo rotating reference frame, which are of the phase-locked loop controller at a negative sequence three-phase inverter voltage. As shown in FIG. 10, high-precision phase locking can also be implemented in the phase-locked loop controller described in this application at the negative sequence three-phase inverter voltage.

Figure 11:
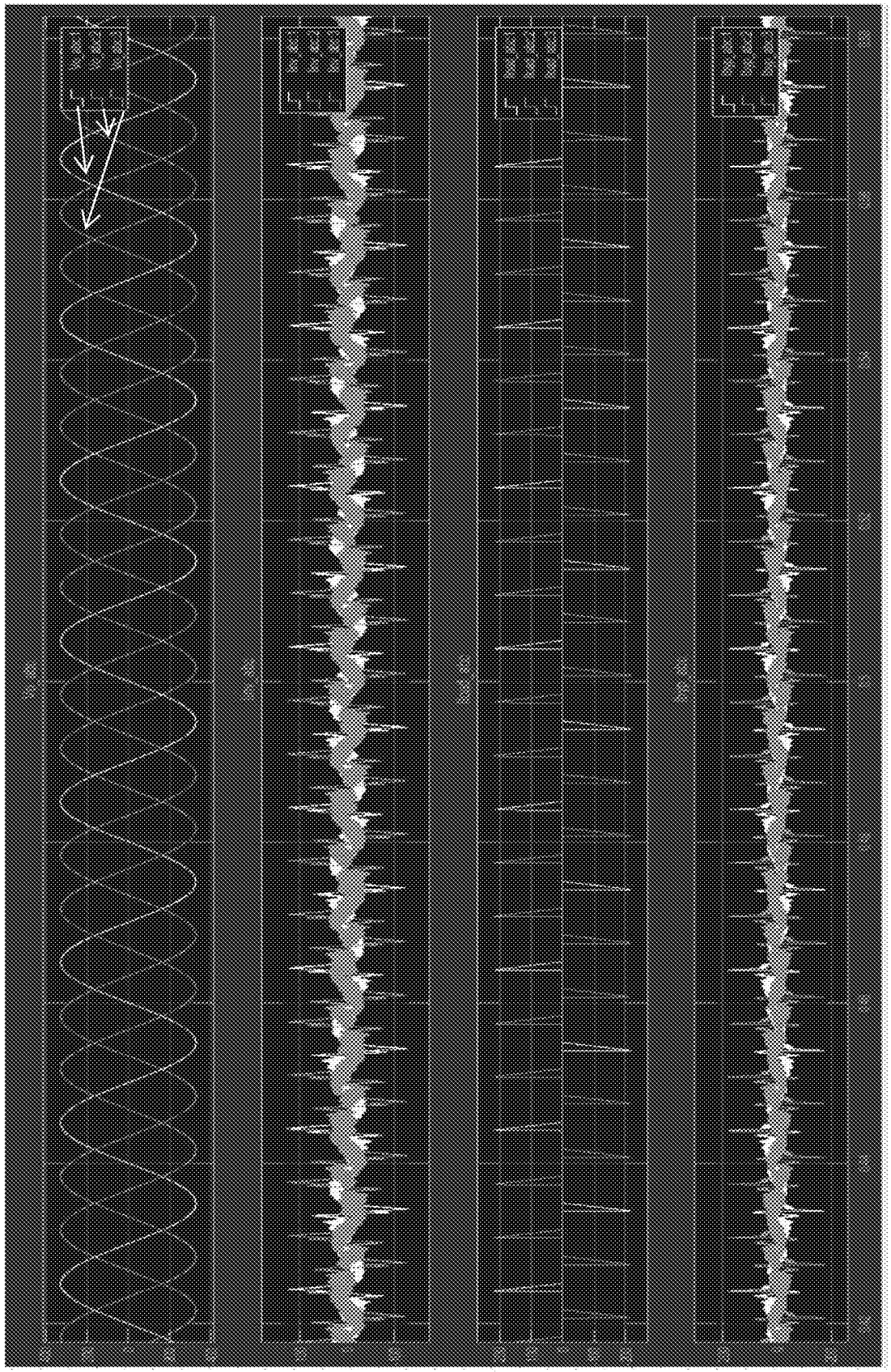
FIG. 11 shows a simulation result in a current loop controller.

FIG. 11 shows a simulation result in a current loop controller. From top to bottom, FIG. 11 sequentially shows a three-phase ideal input abc phase voltage signal, an inverter output abc phase current signal, a load abc phase current signal, and a bypass abc phase current signal (that is, an abc phase current signal input to a power grid, which is equal to a load current signal minus an inverter output current signal). As can be seen from FIG. 11, a harmonic reduce effect is very significant, and harmonic components in waveforms input to the power grid are greatly reduced.

Figure 12:
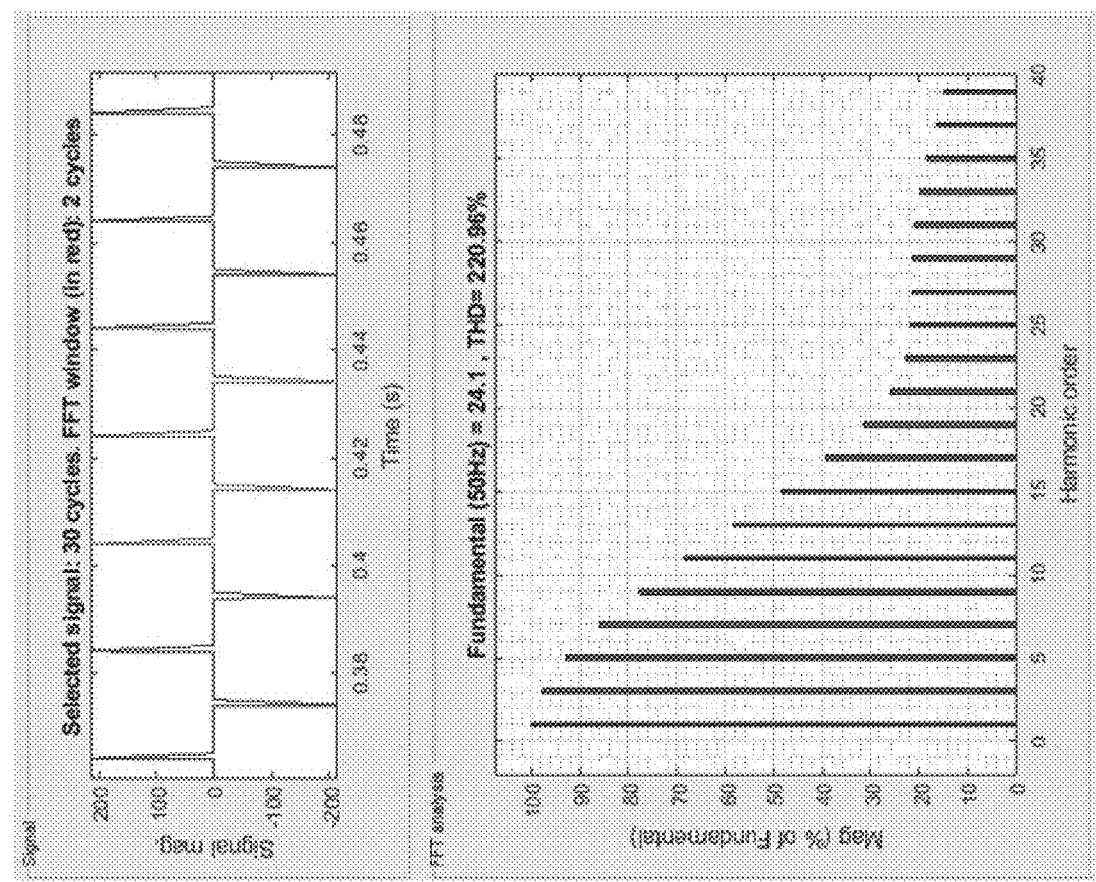
FIG. 12 and FIG. 13 show Fourier analysis and comparison of harmonic components in a bypass current before and after harmonic reduction.
Figure 13:
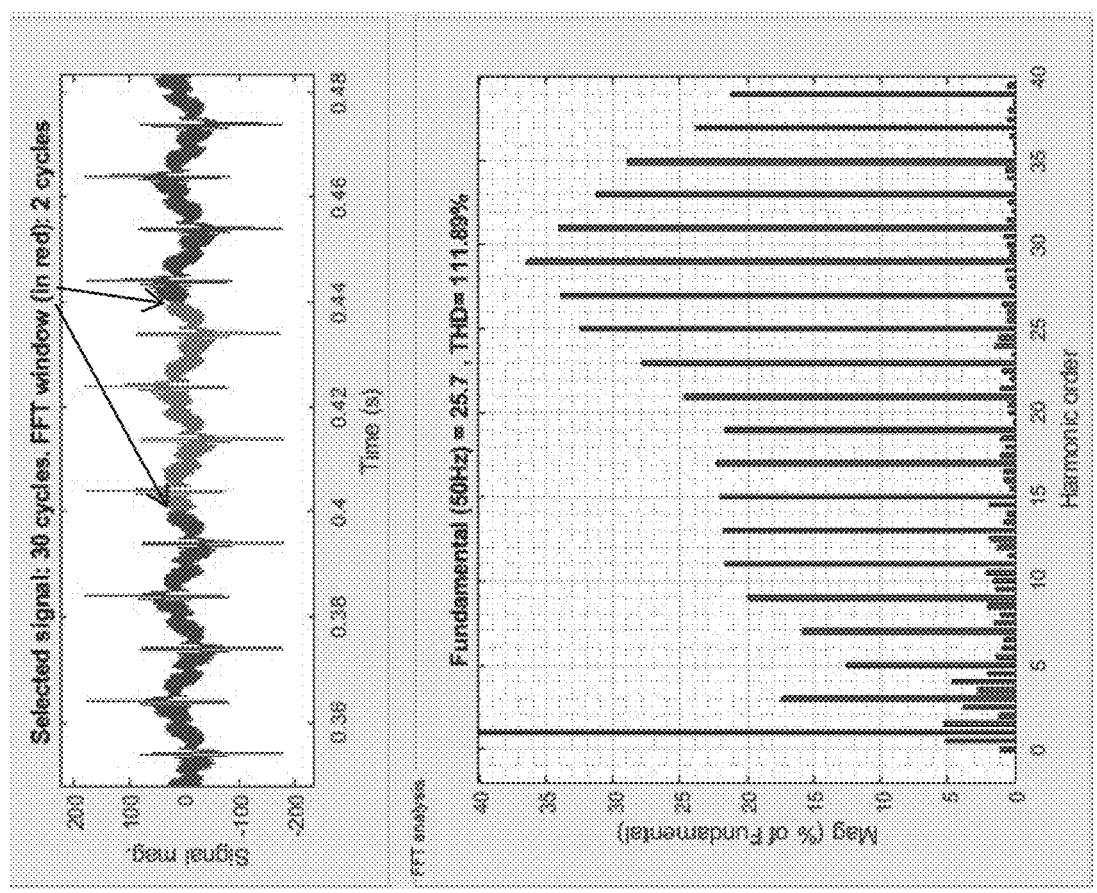

FIG. 12 and FIG. 13 show Fourier analysis and comparison of harmonic components in a bypass current before and after harmonic reduction. It can be learned from FIG. 12 and FIG. 13 that for a non-linear RCD load, when a harmonic reduce control system is not operating, a load current harmonic value THD_Iload=220.9%; and when the harmonic reduce control system is operating, the load current harmonic value THD_Iload=111.9%.

The inventor also verifies the technical effect of the harmonic reduce control system through computer-based experiments.

FIG. 14 to FIG. 18 show display data in an oscilloscope in actual tests.

Figure 14:
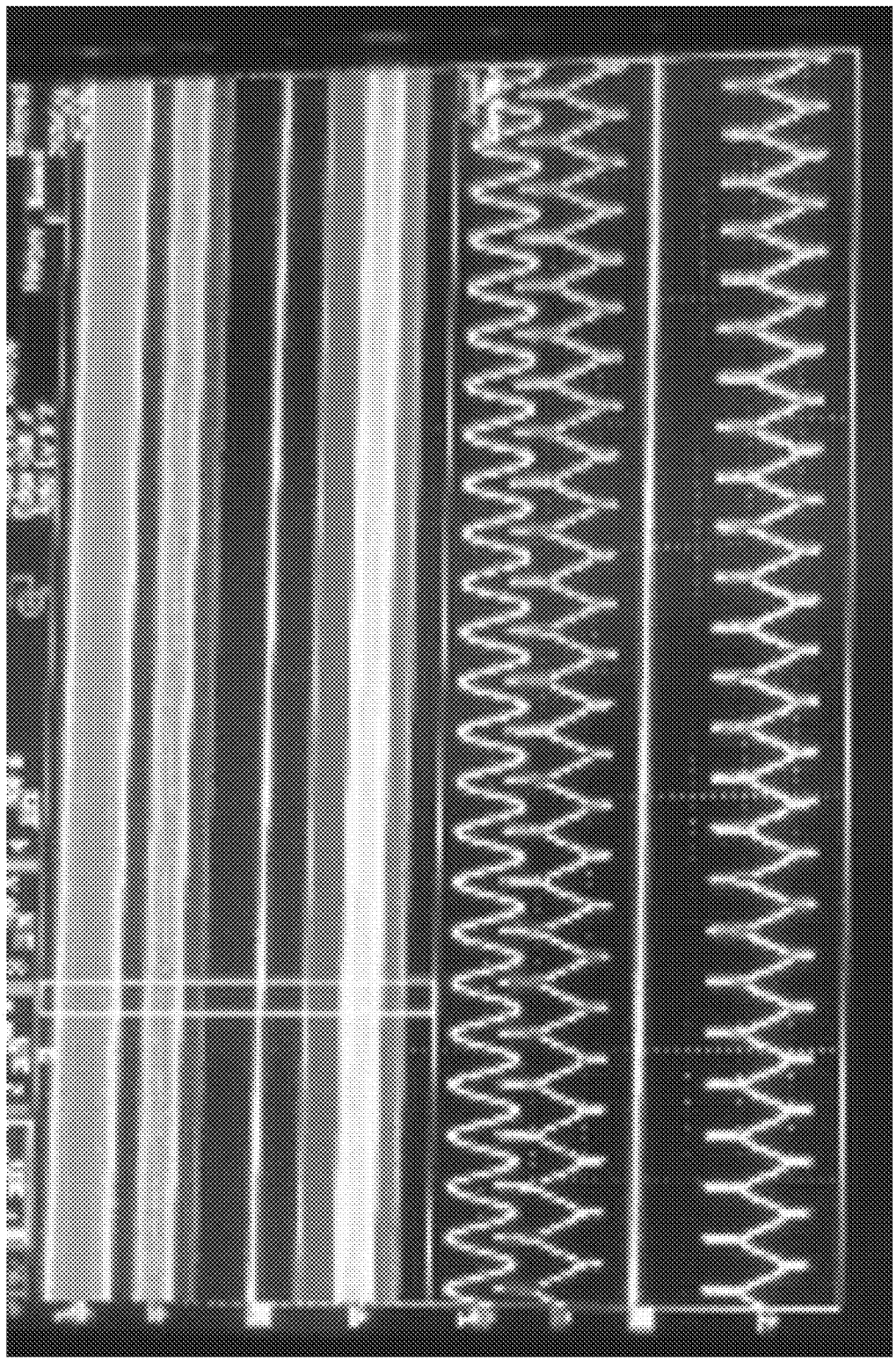
FIG. 14 shows display data of an actual circuit waveform in an oscilloscope when a harmonic reduce control system is not operating in a full load state (pf=0.9) of a non-linear load.

FIG. 14 shows display data of an actual circuit waveform in an oscilloscope when a harmonic reduce control system is not operating in a full load state (pf=0.9) of a non-linear load. FIG. 14 shows channels 1 to 4 of different colors in the oscilloscope. Channel 1 corresponds to a yellow curve, indicating a bypass a-phase voltage; channel 2 corresponds to a green curve, indicating a load a-phase current; channel 3 corresponds to a purple curve, indicating an inverter a-phase current; and channel 4 corresponds to a blue curve, indicating a bypass a-phase current. Clearer curves below are enlarged cut-off parts of the curves above in a white time window. Serious harmonic distortion appears in FIG. 14.

Figure 15:
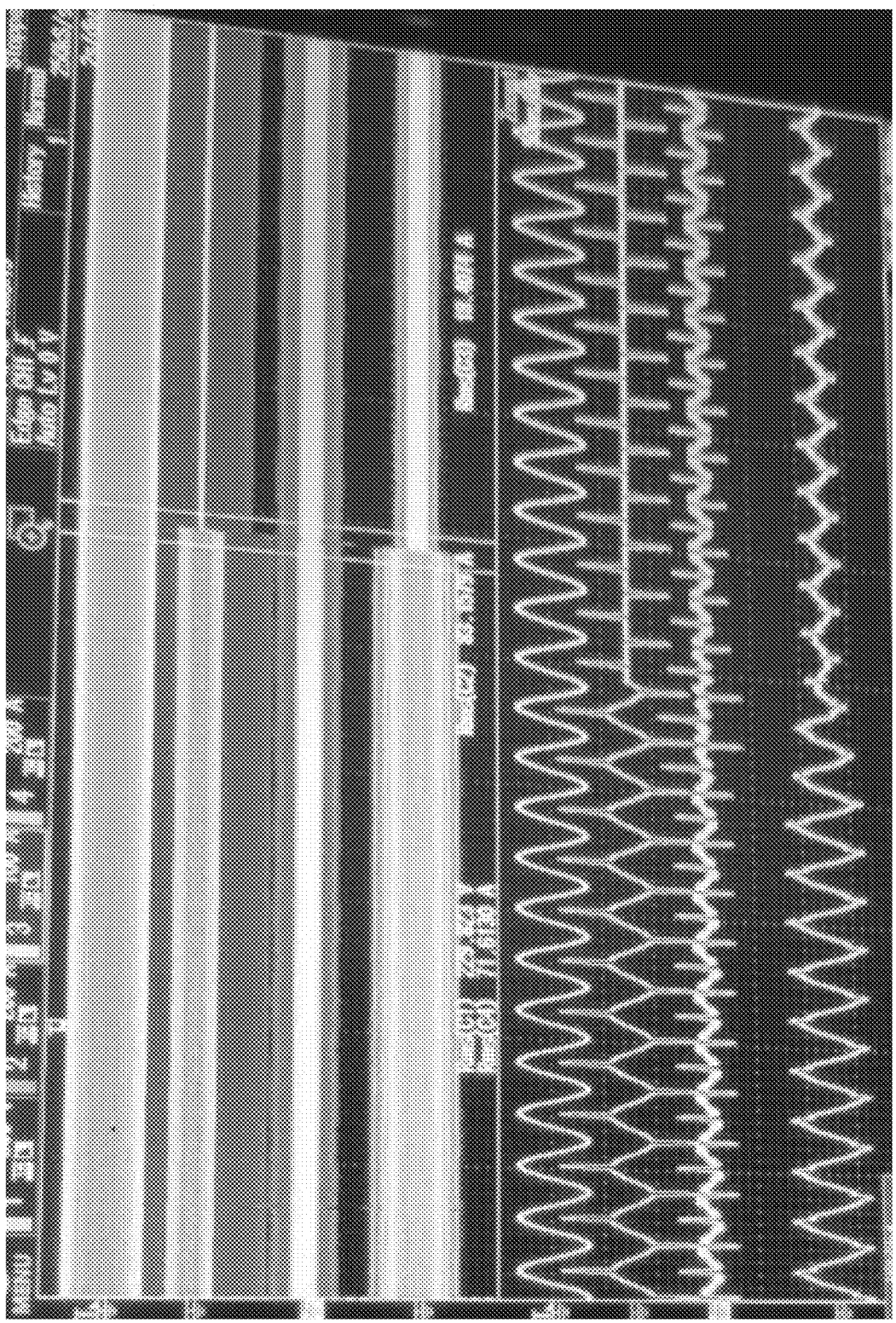
FIG. 15 shows display data of an actual circuit waveform in an oscilloscope after a harmonic reduce control system starts operating from a non-operating state in a process of reducing a non-linear load from 100% to 50%.

FIG. 15 shows display data of an actual circuit waveform in an oscilloscope after a harmonic reduce control system starts operating from a non-operating state in a process of reducing a non-linear load from 100% to 50%. Colors and corresponding components of channels 1 to 4 are consistent with those in FIG. 14, where clearer curves below are enlarged cut-off parts of the curves above in a purple time window. The time at which the harmonic reduce control system starts to work corresponds to an abrupt change of each signal waveform in the purple time window. It can be seen that a current waveform in the blue part, that is, a power grid current, tends to be a perfect waveform after the harmonic reduce control system starts to work.

Figure 16:
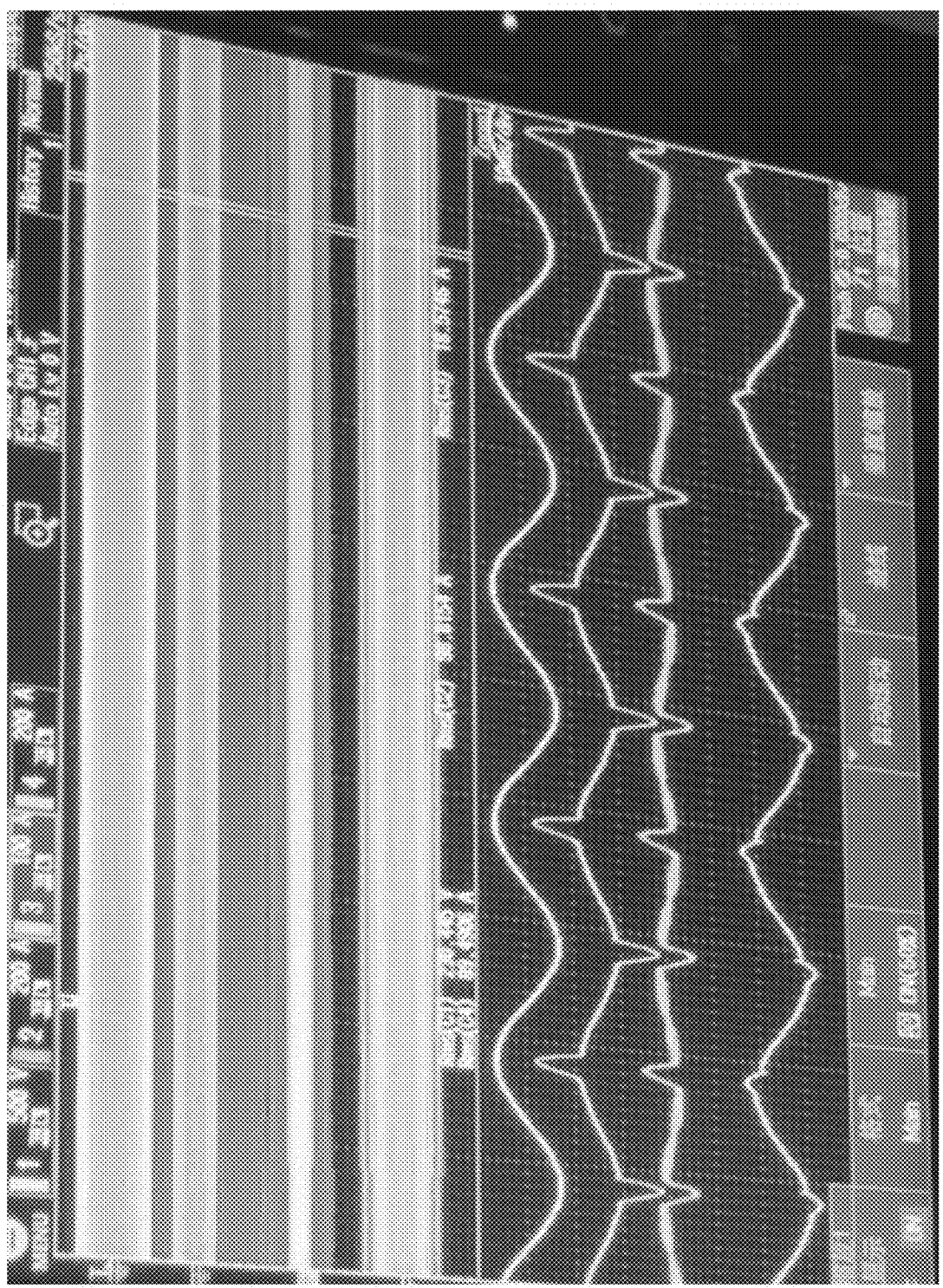
FIG. 16 shows display data of an actual circuit waveform in an oscilloscope when a harmonic reduce control system is operating in a full load state (pf=0.9) of a non-linear load.

FIG. 16 shows display data of an actual circuit waveform in an oscilloscope when a harmonic reduce control system is operating in a full load state (pf=0.9) of a non-linear load. To clearly show a harmonic suppression effect for a bypass current (power grid current) when the harmonic reduce control system is operating, a narrower time window above is selected, so that the shape of a blue curve (bypass current) after compensation below is clearer. FIG. 16 shows that the power grid current compensated by the harmonic reduce control system tends to have a perfect waveform, and harmonic pollution is significantly suppressed.

Figure 17:
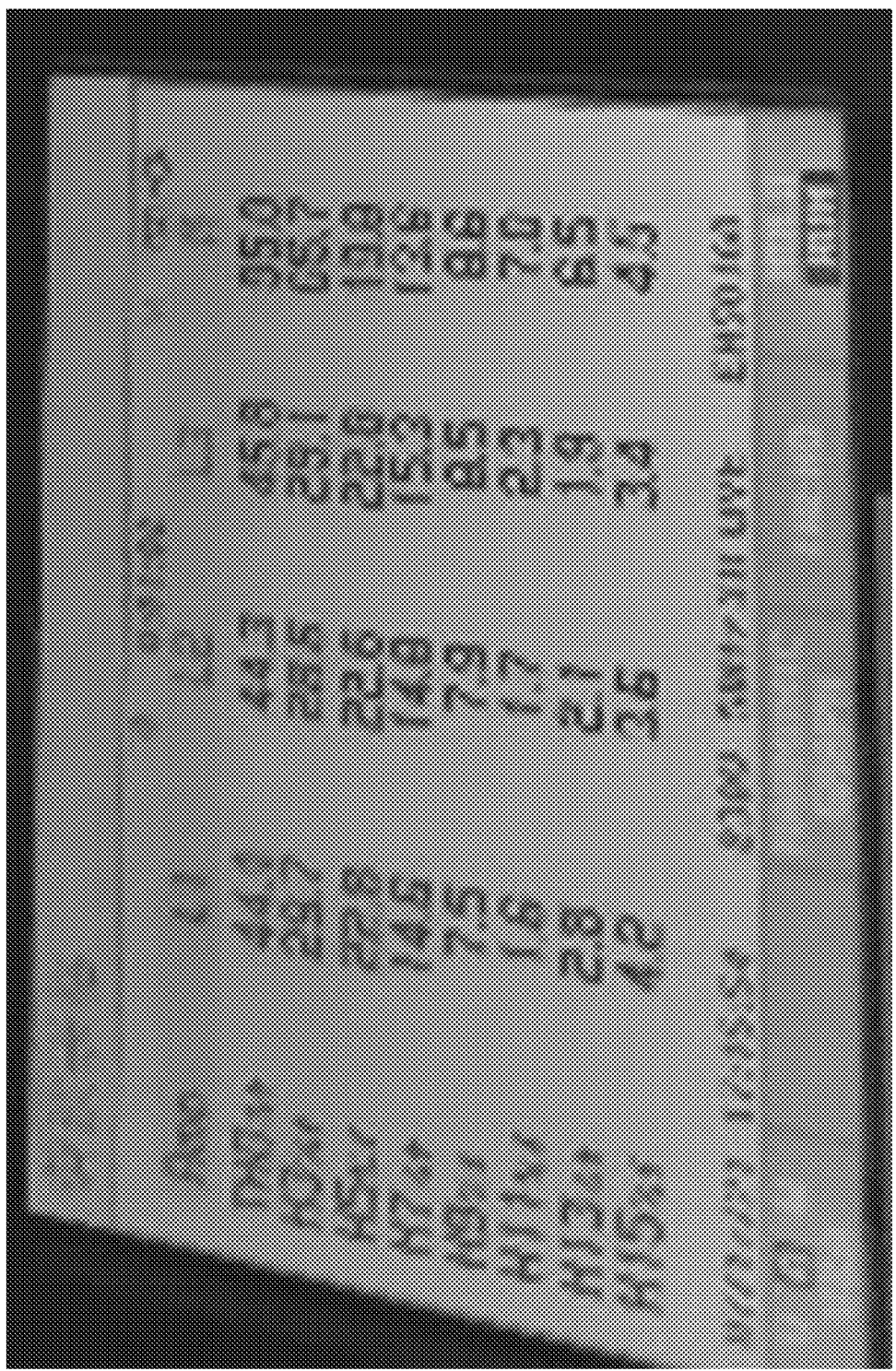
FIG. 17 and FIG. 18 show measurement results of total harmonics and harmonics of various orders before and after operation of a harmonic reduce control system in an actual experiment.
Figure 18:
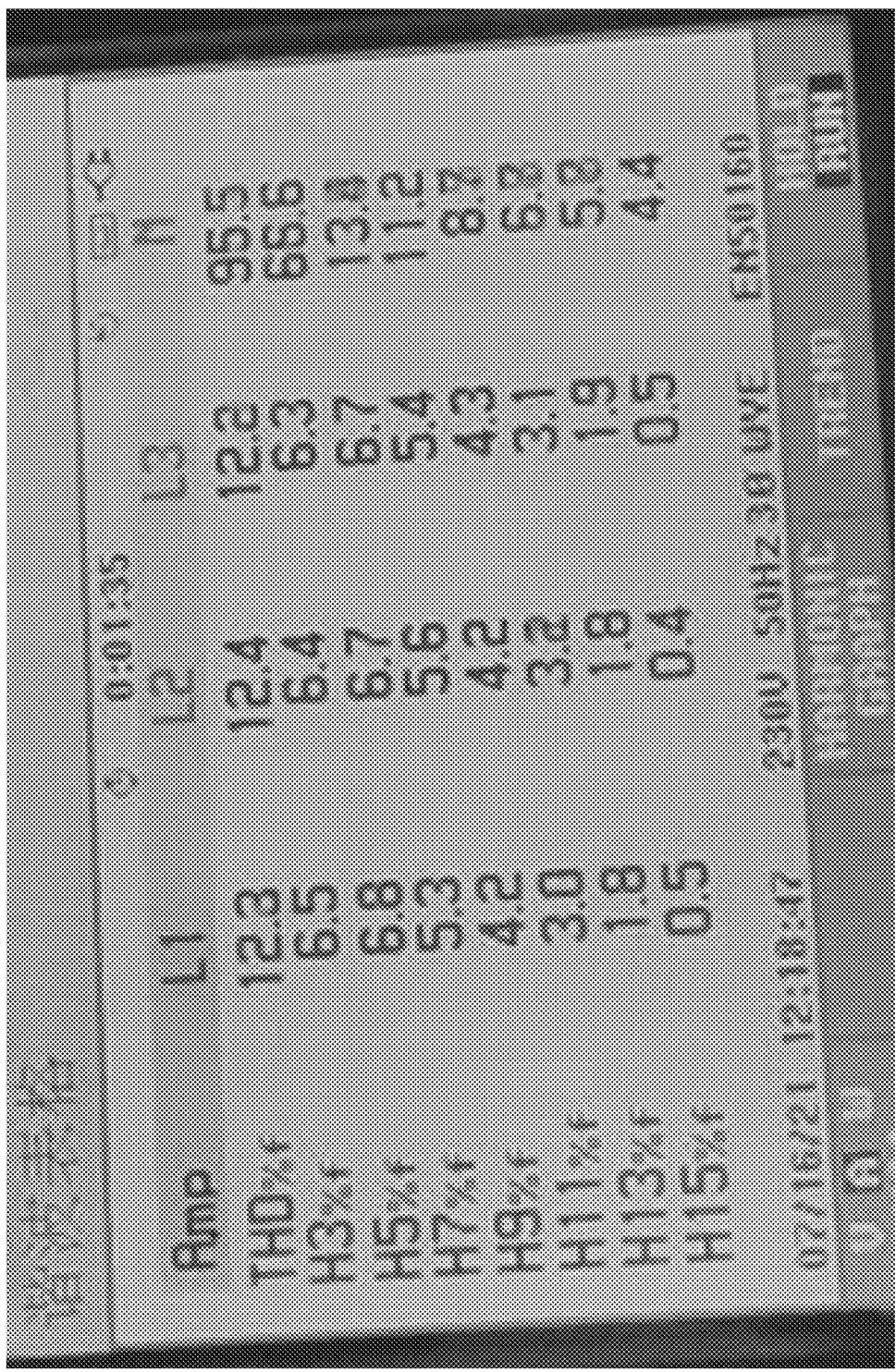

FIG. 17 and FIG. 18 show measurement results of total harmonics and harmonics of various orders before and after operation of a harmonic reduce control system in an actual experiment.

As shown in FIG. 17, before the operation of the harmonic reduce control system, as shown in the first row of the interface, the total load harmonic THD_Iload is approximately 44.3%. The subsequent data shows a proportion of each harmonic from the 3rd order to the 15th order.

As shown in FIG. 18, after the operation of the harmonic reduce control system, as shown in the first row of the interface, the total bypass harmonic THD_Iload is approximately 12.3%. The subsequent data shows a proportion of each harmonic from the 3rd order to the 15th order, and the proportions are reduced to different degrees compared with those in FIG. 17.

Although the present invention has been described by using preferred embodiments, the present invention is not limited to the embodiments described herein, and includes various changes and variations without departing from the scope of the present invention.

What is claimed is:

1. A harmonic reduce control system for controlling an inverter connected between a direct current bus and a load, the inverter having an inverter topology composed of transistors, wherein the harmonic reduce control system comprises:
a phase-locked loop controller, a voltage sum loop controller, a repetitive controller, a current loop controller, and a harmonic obtaining module, wherein the harmonic obtaining module detects a harmonic value of a load current from a load side;
when a power grid and the load are directly connected in a bypass mode, the load current is equal to a sum of an inverter output current and a power grid current;
wherein the harmonic reduce control system is configured to generate an inverter current reference value based on a first current value output by the voltage sum loop controller and the harmonic value, the phase-locked loop controller calculates a real-time frequency value based on a voltage of the power grid, the repetitive controller obtains, through calculation, a repetitive controller output value based on the inverter current reference value, the inverter output current used as a negative feedback, and the real-time frequency value output by the phase-locked loop controller, and the current loop controller outputs a first duty cycle based on the repetitive controller output value; and
wherein the harmonic reduce control system controls a transistor of the inverter based on the first duty cycle to limit the inverter output current, so that harmonics of the power grid current in the bypass mode are reduced.

2. The harmonic reduce control system of claim 1, further comprising a voltage difference loop controller, wherein the voltage sum loop controller outputs a second current value based on a bus voltage reference value and a bus voltage that is used as a negative feedback; and the harmonic reduce control system is configured to:
generate an alpha-beta coordinate axis current reference value based on the secondary current value and a scaling weight between an alternating current voltage and a reference sine voltage;
generate a gamma-axis coordinate reference value based on a differential loop reference between the positive and negative sides of the bus and the amplitude difference of bus voltage across these sides, using this as negative feedback; and
combine the alpha-beta coordinate reference, the gamma-axis reference, and harmonic values to generate the inverter current reference value.

3. The harmonic reduce control system of claim 1, wherein the phase-locked loop controller is a decoupled dual synchronous reference frame (DDSRF) phase-locked loop controller.

4. The harmonic reduce control system of claim 3, wherein the decoupled dual synchronous reference frame phase-locked loop controller is configured to obtain voltage values in both a positive sequence rotating reference frame and a negative sequence rotating reference frame, and to calculate an inverter voltage sinusoidal amplitude and a phase-locked loop controller forward gain coefficient based on the voltage values, wherein the phase-locked loop controller forward gain coefficient is used to calculate the real-time frequency value.

5. The harmonic reduce control system of claim 1, wherein the repetitive controller comprises a delay mechanism, feedback gain, and filtering components to establish a reference for controlling the inverter output, whereby the delay mechanism, feedback gain, and filtering components replace discrete domain equations to provide feedback gain and signal filtration over the controller's operational interval.

6. The harmonic reduce control system of claim 1, wherein the repetitive controller is described by using the following mathematical models:

$$D_{RP}(z) = \frac{z^{-N}}{1 - Q(z)z^{-N}} S(z)$$

$$N = \frac{1}{T_s}/f_{inv}$$

N is a carrier-to-signal ratio, Q(z) is a gain output by a discrete domain positive feedback transfer function, S(z) is a discrete domain filter transfer function, $z^{-N}$ is an N-sample delay element, $T_s$ is a control period of the inverter, and $f_{inv}$ is the real-time frequency value.

7. The harmonic reduce control system of claim 5, wherein the filter transfer function of the repetitive controller utilizes an analog Bessel configuration to provide a near-constant delay across the filter pass band, preserving waveform fidelity for signals within the operating range, and wherein the system adjusts the configuration of the analog Bessel filter to maintain a desired bandwidth.

8. The harmonic reduce control system of claim 6, wherein the discrete domain filter transfer function S(z) is an analog Bessel function, and is described by using the following mathematical model:

$$S(s) = \frac{b_0 s^2 + b_1 s + b_2}{s^2 + a_1 s + a_2}$$

wherein $b_0$, $b_1$, and $b_2$ are zero polynomial coefficients of a filter, and $a_1$ and $a_2$ are pole polynomial coefficients of the filter.

9. The harmonic reduce control system of claim 1, further comprising a feed-forward transfer function module, wherein the feed-forward transfer function module is configured to output a feed-forward duty cycle of a power grid voltage based on the power grid voltage; and the harmonic reduce control system generates a second duty cycle based on a sum of the first duty cycle and the feed-forward duty cycle, and the second duty cycle is used to replace the first duty cycle to control the transistor of the inverter to limit the inverter output current, so that the harmonics of the power grid current in the bypass mode are reduced.

10. The harmonic reduce control system of claim 1, wherein the current loop controller is a dual-zero dual-pole type configured with time constants for each zero and pole combined with a feed-forward gain to optimize the responsiveness and phase control of the current loop.

11. The harmonic reduce control system of claim 1, wherein the current loop controller is a dual-zero dual-pole type current loop controller, and a transfer function of the dual-zero dual-pole type current loop controller may be described by using the following mathematical model in a continuous domain:

$$D_i(s) = K_{fw\_i} \frac{\tau_a s + 1}{s} \frac{\tau_b s + 1}{\tau_c s + 1}$$

wherein $K_{fw\_i}$ is a current loop feed-forward gain, $\tau_a$ and $\tau_b$ are current controller zero time constants a and b, and $\tau_c$ is a current controller pole time constant c.

12. An inverter connected between a direct current bus and a load, wherein the inverter is a three-phase inverter, the invertor comprising:
a harmonic reduce control system for controlling the inverter, the harmonic reduce control system comprising:
a phase-locked loop controller, a voltage sum loop controller, a repetitive controller, a current loop controller, and a harmonic obtaining module, wherein the harmonic obtaining module detects a harmonic value of a load current from a load side;
when a power grid and the load are directly connected in a bypass mode, the load current is equal to a sum of an inverter output current and a power grid current;
wherein the harmonic reduce control system is configured to generate an inverter current reference value based on a first current value output by the voltage sum loop controller and the harmonic value, the phase-locked loop controller calculates a real-time frequency value based on a voltage of the power grid, the repetitive controller obtains, through calculation, a repetitive controller output value based on the inverter current reference value, the inverter output current used as a negative feedback, and the real-time frequency value output by the phase-locked loop controller, and the current loop controller outputs a first duty cycle based on the repetitive controller output value; and
wherein the harmonic reduce control system controls a transistor of the inverter based on the first duty cycle to limit the inverter output current, so that harmonics of the power grid current in the bypass mode are reduced.

13. An uninterruptible power supply comprising:
a three-phase inverter connected between a direct current bus and a load; and
a harmonic reduce control system configured to control the three-phase inverter, wherein the harmonic reduce control system comprises:
a phase-locked loop controller, a voltage sum loop controller, a repetitive controller, a current loop controller, and a harmonic obtaining module, wherein the harmonic obtaining module detects a harmonic value of a load current from a load side;
when a power grid and the load are directly connected in a bypass mode, the load current is equal to a sum of an inverter output current and a power grid current;
wherein the harmonic reduce control system is configured to generate an inverter current reference value based on a first current value output by the voltage sum loop controller and the harmonic value, the phase-locked loop controller calculates a real-time frequency value based on a voltage of the power grid, the repetitive controller obtains, through calculation, a repetitive controller output value based on the inverter current reference value, the inverter output current used as a negative feedback, and the real-time frequency value output by the phase-locked loop controller, and the current loop controller outputs a first duty cycle based on the repetitive controller output value,
wherein the harmonic reduce control system controls a transistor of the inverter based on the first duty cycle to limit the inverter output current, so that harmonics of the power grid current in the bypass mode are reduced, and
wherein the uninterruptible power supply directly supplies power from the power grid to the load in the bypass mode.

* * * * *